United States Patent [19]

Susumu

[11] 4,108,363

[45] Aug. 22, 1978

[54] RECORD CONTROLLED MECHANICAL STORE

[76] Inventor: Iida Susumu, 1246, Sengokuhara, Hakone-cho, Ashigarashimo-gun, Kanawaga-ken, Japan

[21] Appl. No.: 699,974

[22] Filed: Jun. 25, 1976

[30] Foreign Application Priority Data

| | | | |
|---|---|---|---|
| Jun. 25, 1975 | [JP] | Japan | 50-77535 |
| Sep. 8, 1975 | [JP] | Japan | 50-108067 |
| Oct. 23, 1975 | [JP] | Japan | 50-126900 |
| Oct. 4, 1975 | [JP] | Japan | 50-119380 |
| Oct. 28, 1975 | [JP] | Japan | 50-128909 |
| Dec. 30, 1975 | [JP] | Japan | 50-158712 |

[51] Int. Cl.[2] .......... G06K 15/00

[52] U.S. Cl. .......... 235/383; 194/1 R; 221/150 HC; 177/4; 177/25; 177/245

[58] Field of Search .......... 221/1, 2, 3, 8, 21, 221/92, 150 R, 150 HC; 194/1 R, 2, 4, 10; 235/151.33, 92 WT, 91 L, 487; 177/4, 25, 245

[56] References Cited

U.S. PATENT DOCUMENTS

| | | | |
|---|---|---|---|
| 2,663,398 | 12/1953 | Skillman | 194/10 |
| 2,919,851 | 1/1960 | Otis | 235/91 L |
| 3,023,851 | 3/1962 | Stiller | 186/1 R |
| 3,491,870 | 1/1970 | Isserstedt | 221/2 X |
| 3,836,755 | 9/1974 | Ehrat | 186/1 AC X |
| 3,863,724 | 2/1975 | Dalia | 177/25 |
| 3,881,574 | 5/1975 | Grange | 186/1 C |

*Primary Examiner*—Robert B. Reeves
*Assistant Examiner*—Joseph J. Rolla
*Attorney, Agent, or Firm*—Beall & Jeffery

[57] ABSTRACT

A vending machine which measures the weights of a retaining vessel, having commodities, so as to determine the difference in weight before and after the removal of commodities as an electrical signal. An in-line system includes a locking access door for taking out commodities from the machine by inserting a lock-releasing medium into the automatic vending machine. An off-line system includes a system for storing nomenclature, quantity, price and the like of commodities to be purchased by inserting a storing medium into the automatic vending machine. For insuring an accurate quantity of commodities to be purchased, and prevention of an unlawful act or purchase, there is provided a system for indicating a quantity and weight of commodities, prior to purchase, a radiant energy source for forming a beam curtain covering the front of a body proper of an automatic vending machine, a heater exchange maintaining a door and a weighing scale in a certain temperature range, and a warning system for issuing an alarm signal and a communicating signal, when commodities are purchased unlawfully. An off-line system permits automated accounting, so that man power of employees may be saved to a large extent, with accompanying improvements in control of commodities. A purchaser may check and select commodities in one's hands before purchasing.

32 Claims, 40 Drawing Figures

RECORD CONTROLLED MECHANICAL STORE

BACKGROUND OF THE INVENTION (a) Field of the Invention

This invention relates to an automatic vending machine, and more particularly to a novel automatic vending machine having a mechanism adapted to count a quantity of commodities purchased, by weighing the weight of commodities, while providing a commodity-housing body in the form of a display stand.

(b) Description of the Prior Art

Recently, an automatic vending machine has found a wide application pursuant to popularization of a super-market and self-service sales station of a department store, for the purposes of effective utilization of an area of a sales station and saving man power. At the present time, an automatic vending machien as used in a manless super-market has made a tremendous progress in this field. Thus, description will be given of the aforesaid prior art automatic vending machine in conjunction with the accompanying drawings.

FIG. 1 shows an outlook of a display stand which stores or retains commodities on shelves. In case commodities are sold in a display stand of this type, a great quantity of commodities are displayed for purchasers and the purchasers may take out commodities of a desired quantity out of commodities placed on shelves, while one can not automatically obtain sales-information of commodities, such as an identification number, nomenclature, quantity, unit price, total charge and the like.

FIGS. 2 and 3 show an automatic vending machine having a considerable depth, which is used in a prior art manless super-market. More particularly, a body proper of an automatic vending machine includes: a plurality of units 1, each of which houses commodities aligned in the depthwise direction and allows commodities to be taken out from the front; and a shopping-card inserting slit 2, into which a shopping card is to be inserted. Still more specifically, the units 1 are placed in the front portion of the machine for ease in taking out commodities and each consists of a small door 3 which is adapted to be opened or closed due to a shopping card being inserted, a double-taking-out-operation-preventive shutter 5 which permits only one commodity to be taken out of commodities 4, a commodity push plate 6 adapted to push a commodity towards a purchaser, a drive motor 7 which forces a commodity 4 towards a purchaser. Such a prior art automatic vending machine is composed of a number of parts, so that the construction of the machine is complex and suffers from frequent troubles in addition to a failure in moving commodities smoothly.

On the other hand, when commodities 4 are housed or stored in an automatic vending machine, operators suffer from difficulty in charging these commodities into units 1, because of small inner space of the unit 1, and has to expend a considerable time for such an operation due to a number of units 1. In addition, since the commodities 4 are moved by means of a drive motor 7, a purchaser has to take out commodities one after another, when he or she wants a plurality of commodities at a time, so that a purchaser has to wait until he can obtain commodities of a desired quantity. Still furthermore, a number of parts including the drive motor 7 leads to a high price of an automatic vending machine. As is apparent from the foregoing, the prior art automatic vending machine suffers from many shortcomings.

Another prior art automatic vending machine, unlike the aforesaid unit type machine, is so constructed that the front of the machine is enclosed with a glass plate, and baskets are placed interiorly thereof for taking out commodities therefrom. Thus, commodities to be purchased are placed in a basket and then the basket is moved towards a purchaser. This type automatic vending machine also involves the aforesaid shortcomings experienced with a unit type automatic vending machine.

SUMMARY OF THE INVENTION

It is accordingly an object of the present invention to provide an automatic vending machine which avoids the aforesaid shortcomings confronted with a prior art vending machine, and which permits an easy charging operation for operators or employees as well as allows a purchaser to check and select a commodity in one's hands before making a decision to purchase same, and to select a plurality of commodities without an expenditure of a long stand-by time.

It is another object of the present invention to provide an automatic vending machine which may supply a sales-information to a manager of a market and which is simple in construction, not expensive and free of troubles.

According to the present invention, there is provided an automatic vending machine which adopts a display-stand system having shelves adapted to retain commodities thereon, a weighing scale for counting a quantity of commodities purchased, and an electronic computor, into which a sales-information of commodities is input, thereby rationalizing the sales system of commodities.

DESCRIPTION OF THE PREFERRED EMBODIMENTS

Figure 1:
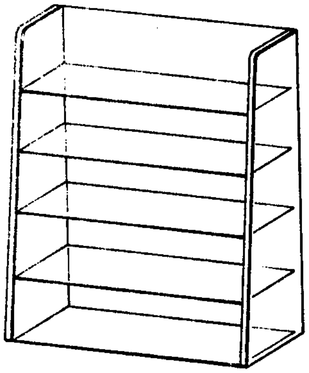
FIG. 1 PRIOR ART
FIG. 1 is an outlook of a display stand, in which commodities are placed on shelves, in a general type market.
Figure 2:
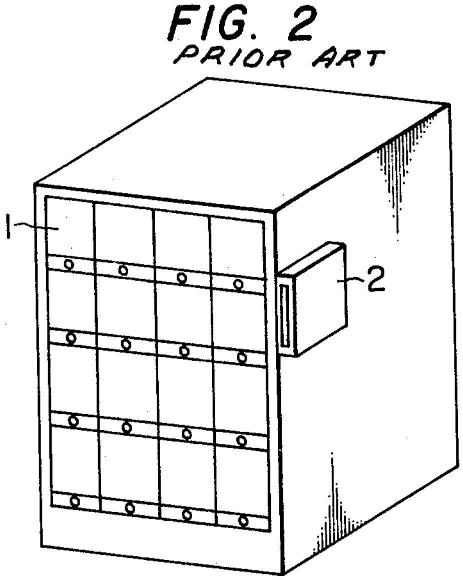
FIG. 2 PRIOR ART
FIG. 2 is an outlook of a prior art automatic vending machine having a considerable depth.
Figure 3:
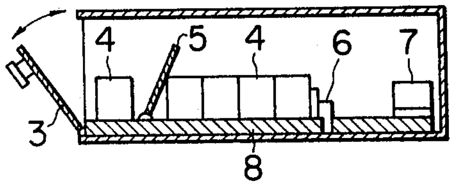
FIG. 3 PRIOR ART
FIG. 3 is a detailed view of the interior of units as used in the aforesaid prior art automatic vending machine having a considerable depth.
Figure 4:
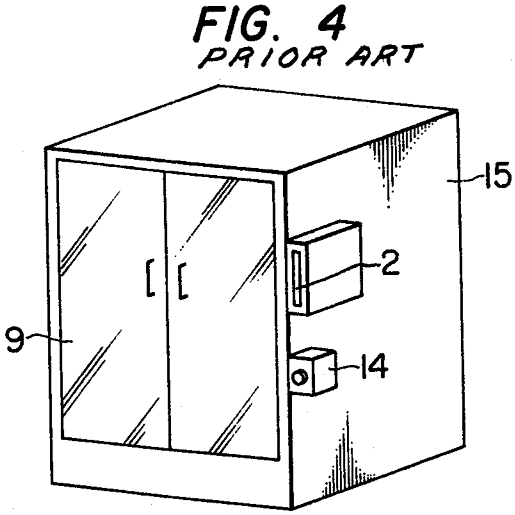
FIG. 4 PRIOR ART
FIG. 4 is a perspective view of the first embodiment of an automatic vending machine according to the present invention.
Figure 5:
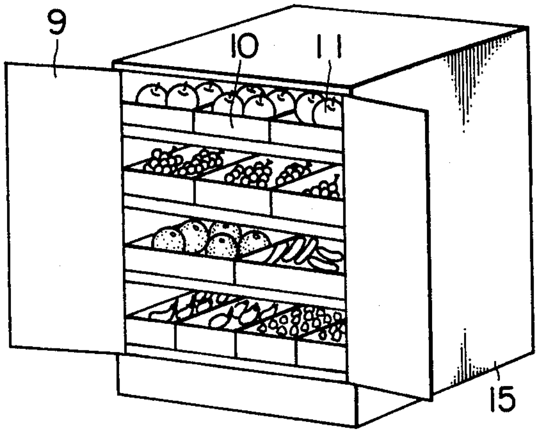
FIG. 5 is a perspective view showing a door in its open position.
Figure 6:
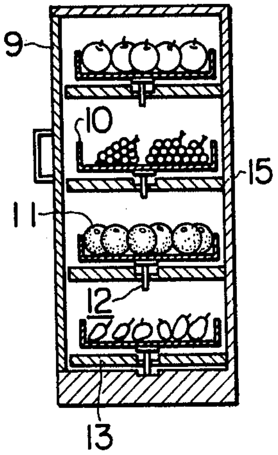
FIG. 6 is a transverse cross-sectional view of the machine of FIG. 4.
Figure 7:
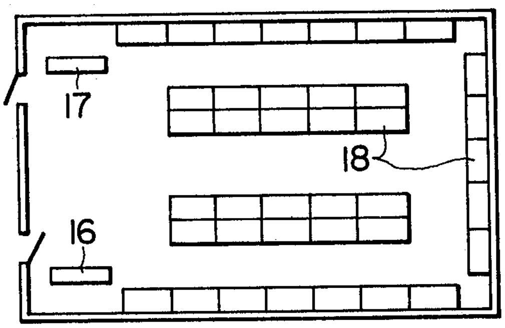
FIG. 7 is a view showing an arrangement of a plurality of automatic vending machines according to the present invention within a market.

Referring to FIG. 4, there is shown the first embodiment of an automatic vending machine according to the present invention. In FIG. 5, there is shown a perspective view showing an automatic vending machine, with a door being opened. FIG. 6 shows a transverse cross-sectional view, i.e., a view as seen sidewise, of the automatic vending machine of FIG. 4, and FIG. 7 is a view showing an arrangment of a pluality of automatic vending machines according to the present invention.

As shown in FIG. 6, an automatic vending machine consists of a body proper 15, shelves 13 provided within the body proper 15 in the form of a plurality of stages, weighing scales 12 positioned contiguous to the shelves 13, respectively, and display baskets or retaining boxes 10 which are portable and retain one or more commodities 11 therein according to the kinds of commodities, such as canned foods, fruit, dental creams, and other daily necessaries. The quantity of display baskets 10 may be plural, if the items of commodities to be placed on a weighing scale are the same. In addition, commodities to be retained may be placed simply on a retaining unit of a flat plate, which is suspended from a beam and exerts a force on a weighing scale, or other means such as retaining boxes including display baskets 10, which transmit the weight of commodities to the weighing scale 12. As shown in FIG. 4 and FIG. 5, secured to the outer side-surface of the body proper 15 of the machine is a box, in which there is provided a shopping-card-inserting slit 2, through which a lock-releasing and storing medium such as a magnetic card and the like is to be inserted; such medium integrally consists of a lock-releasing medium for permitting the removal of commodities from the automatic vending machine, and storing means for storing at least one commodity-information of nomenclature, weight, quantity, price and other information of commodities. A shopping-completion-indicating device 14 notifies the completion of shopping. The front wall of a body proper 15 of the machine is transparent, so that a purchaser may watch commodities 11 therethrough.

Figure 38A:
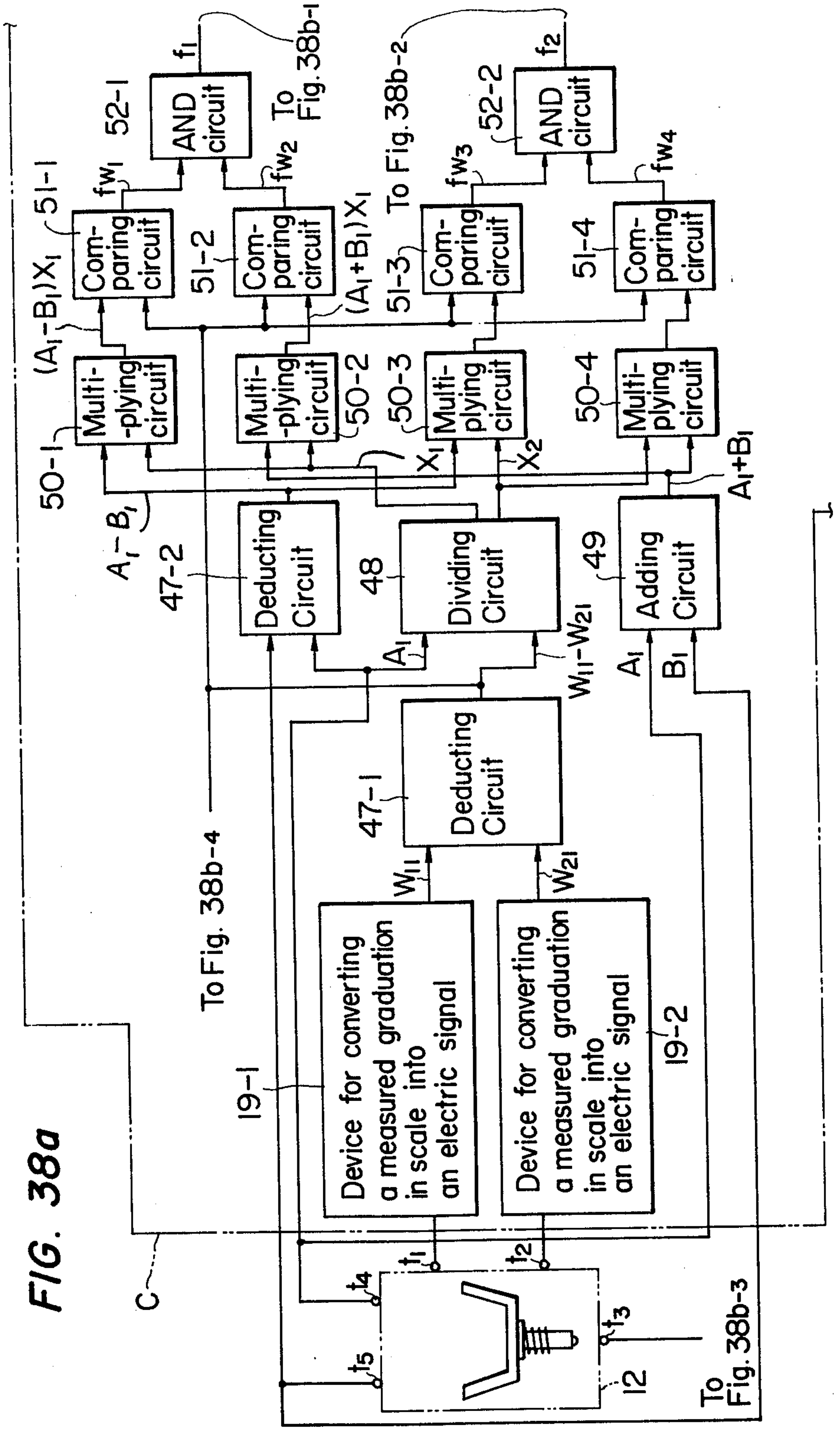
FIG. 38 (*a*), (*b*) is a block diagram showing an arrangement of circuits in the automatic vending machine according to the present invention.
Figure 38B:
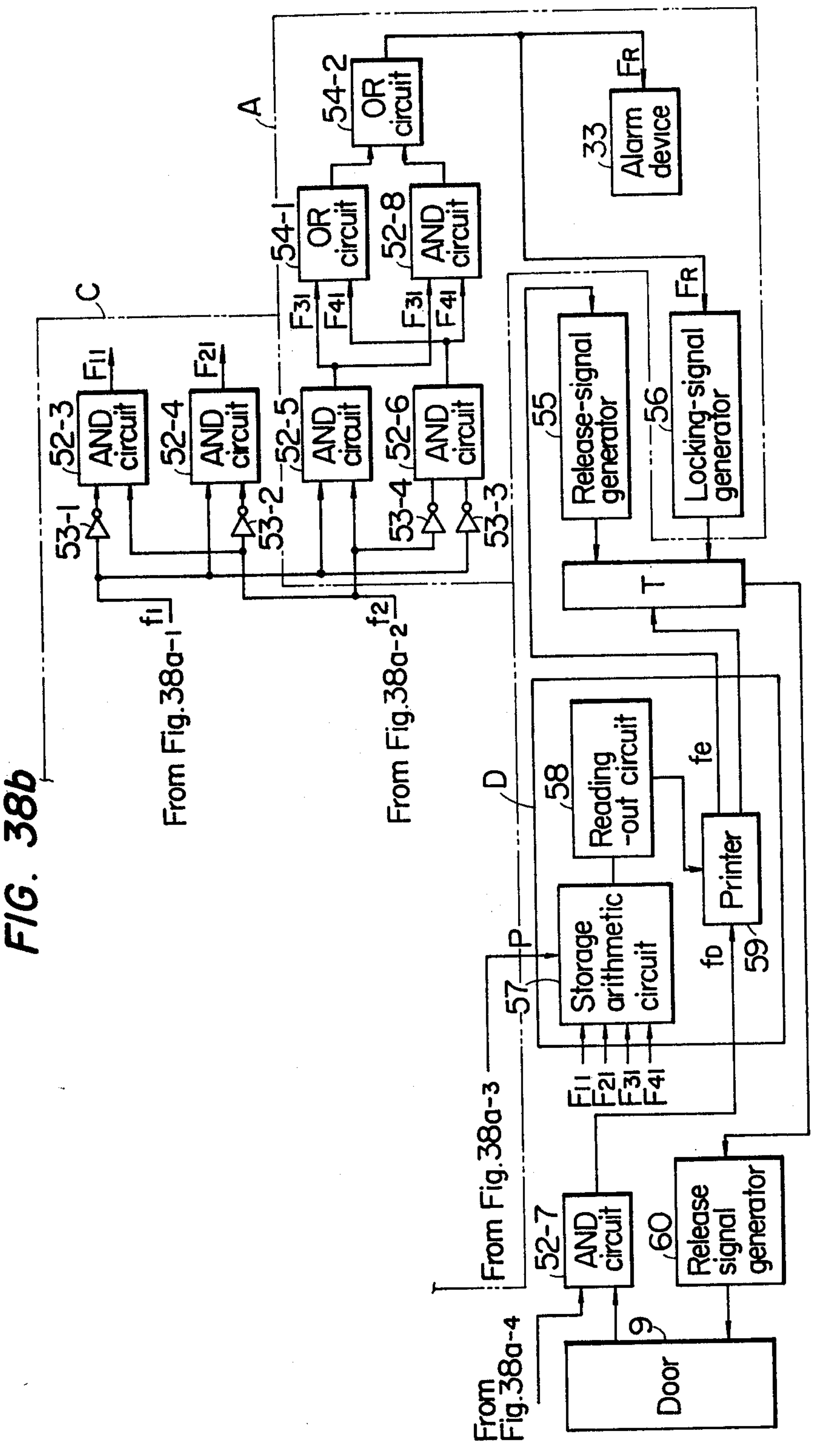

The body proper 15 is equipped with a door 9 which may be released from a locked condition, upon insertion of a shopping card into the slit 2. When the door 9 is closed, then a circuit will be operated, which instructs to input into a shopping card information such as items, quantity and the like of commodities which have been taken out. The arrangement of a circuit is shown in FIG. 38, and the operation thereof will be described hereinafter. The door 9 remains closed tightly, when a shopping card is not inserted into the shopping-card-inserting slit 2. Once a shopping card is inserted into the shopping-card-inserting slit 2, then the door 9 will be released so as to be free to open or close, while there is provided a locking mechanism which precludes taking out the shopping card from the shopping-card-inserting slit 2, when the door 9 remains opened.

Figure 39:
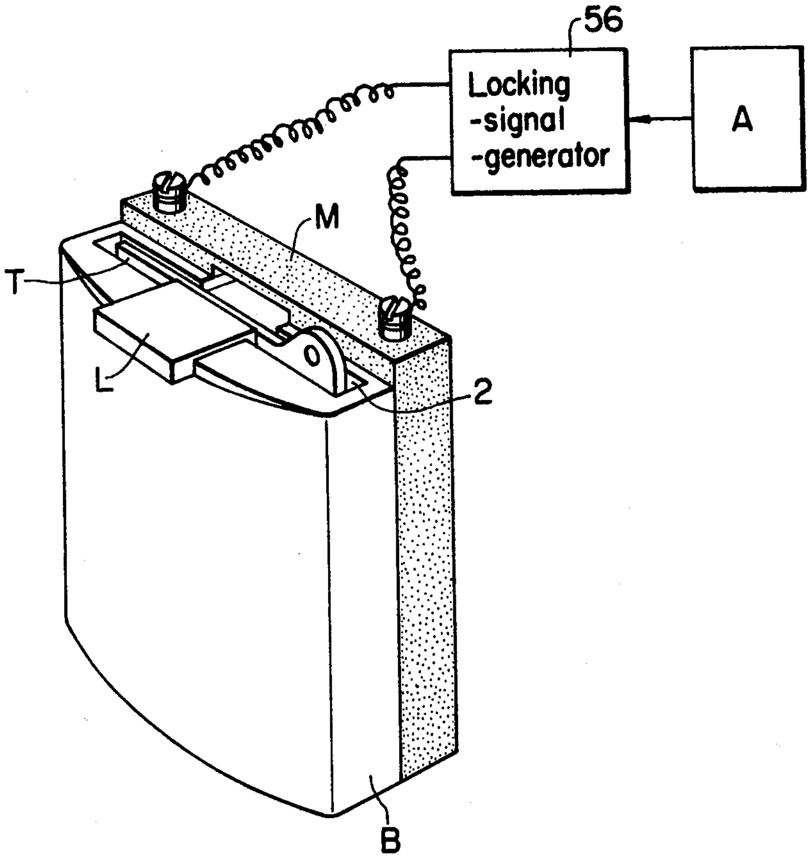
FIG. 39 is a view showing one example of a locking mechanism for use with shopping cards.

One example of the construction of the locking mechanism for shopping cards is shown in FIG. 39, in which a lock-releasing and storing medium T such as a shopping card may be inserted into a slit 2. Mounted on the surface of the body proper 15 and in back of the box B having the slit 2 of the locking mechanism is an electromagnet M. The electromagnet M is excited according to a locking signal which, upon issuing of an alarm signal from an alarm device A, is transmitted by way of a locking-signal-generator 56 to the electromagnet M, so that a locking piece L is attracted so as to lock a shopping card. On the other hand, if a door is closed, a shopping card, into which sales-informations have been input, will be free to take out.

Figure 12:
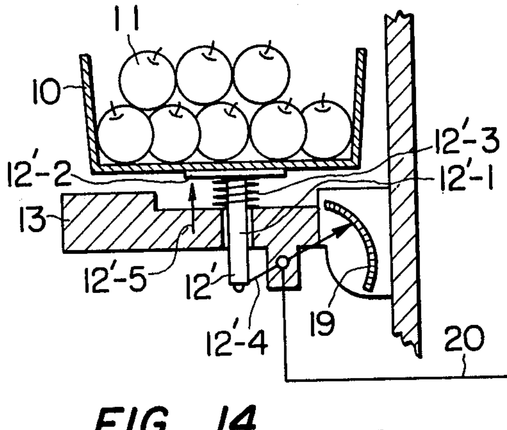
FIG. 12 is a view showing a weighing scale arranged.

Now, description will be given of a weighing scale 12, which forms an essential part of the present invention. FIG. 12 shows an arrangement of the weighing scale 12. A weighing scale 12' is provided as one example of weighing scale 12. The scale 12' consists of a stem 12'-1 which is slidable through a hole defined in a shelf 13, a flat plate 12'-2 secured to a tip portion of the stem 12'-1 for mounting a display basket 10 thereon, a spring 12'-3 confined between the shelf 13 and the flat plate 12'-2, a pointer 12'-4 secured to an end portion of the stem 12'-1. When a commodity is taken out, then the stem 12'-1 is slidingly moved in an arrow direction 12'-5 under the action of the spring 12'-3, so that the pointer 12'-4 is rotated so as to sharply respond to the variation in weight of commodities.

Positioned at one termination of a graduation of the scale 12' is a means 19, such as a potentiometer, for converting a graduation indicated into an electrical signal, while a signal line 20 connected to the means 19 leads to an electronic computor 21.

According to the automatic vending machine of the present invention, a purchaser makes payment for commodities selected in the following process: Assume a total weight $w1$ of the weight of commodities prior to removal or purchase plus the weight of a display basket 10, the total weight $w2$ of the commodities and display basket 10 after the removal, an average weight $a$ of a single commodity, and a quantity $x$ of commodities taken out or purchased. $w1$ and $a$ are stored in the electronic computor 21. In case a purchaser takes out commodities of a quantity $x$ from the display basket 10, and closes the door 9, then a balance between $w1$ and $w2$ ($w1$-$w2$), i.e., between the weight $w1$ before removal of commodities and the weight $w2$ after the removal is measured by the weighing scale 12, whereupon an information is fed into the electronic computor 21 for computing $(w1\text{-}w2)/a$, based on the value $a$ which has been stored in the computor 21, so that a quantity of commodities removed or purchased may be determined. In general, the respective weights of commodities are not the same, even if the items of commodities are the same. It is possible that a figure thus obtained according to the aforesaid computation includes a decimal fraction, or if a quantity of commodities taken out exceeds a given value, then there results a difference exceeding "1" between a calculated value and an actual quantity of commodities taken out. Assume now an average weight A of a single commodity, a balance between the average weight A and the maximum weight or the minimum weight of a commodity, i.e., an error weight B, a balance W between readings before and after the removal of a commodity, a number of quantity $x$ of commodities taken out, a figure $x1$ of a value of W/A whose decimal fraction has been raised to a unit, and a figure $x2$ of a value W/A whose decimal fraction is omitted. When the $x1$ or $x2$ is determined according to a flow chart shown in FIG. 13, then the value $x$ may be determined. In other words, it is determined whether W satisfies the following two formulae, $$(A\text{-}B)\,x1 \leqq W \leqq (A+B)\,x1 \qquad (1)$$

$$(A\text{-}B)\,x2 \leqq W \leqq (A+B)\,x2 \qquad (2)$$

1. If the formular (1) is not satisfied, while the formula (2) is satisfied by W then $x=x2$ 2. If the formula (1) is satisfied, while the formula (2) is not satisfied, then $x=x1$ 3. If both formulae are satisfied, this means that a quantity of commodities taken out exceeds the aforesaid limit of quantity.

4. If both formulae (1) and (2) are not satisfied, this means that other commodity or material having a weight different from that of a commodity is included, or some other abnormal condition prevails.

Accordingly, in the cases of the above paragraphs 3 and 4, an alarm signal will be issued, and a locking mechanism will be actuated so as to preclude the removal of a shopping card from the shopping-card-inserting slit. Thus, the quantity of commodities taken out may be determined without an error, by means of a weighing scale 12 and means 19 for converting a measured graduation in the scale, into an electrical signal. FIG. 38 (*a*), (*b*) shows an embodiment of a circuit which carries out the aforesaid computations.

Encompassed with a broken line and shown at 12 is weighing scale portion, at C an arithmetic-circuit portion, and at 9 a door of an automatic vending machine. A total weight signal $w11$ before purchase or removal of commodities is fed through a terminal $t1$ of a weighing scale 12 and a total weight signal $w21$ after the purchase is fed through a terminal $t2$ of the scale 12, respectively, then through means or convertor 19-1 for converting a measured graduation in the scale into an electrical signal and means or convertor 19-2 for converting the graduation in the scale into an electric signal, and then into a deduction circuit 47-1 to give $w11$-$w21$. A value of $w11$-$w21$, coupled with an average weight A1 of a single commodity which has been fed through a terminal $t4$, if fed into a dividing circuit 48 to obtain $w11\text{-}w21/A1$. In this case, the dividing circuit 48 computes two values i.e., $x1$ which is $w11\text{-}w21/A1$ whose decimal fraction has been raised to a unit, and $x2$ which is $w11\text{-}w21/A1$ whose decimal fraction has been omitted.

On the other hand, the deduction circuit 47-2 is so designed as to give A1-B1 by using a balance between an average weight and the maximum weight or the minimum weight of a commodity, i.e., an error weight B1 which is to be fed through a terminal $t5$ of the scale 12, while an adding circuit 49 is so designed as to give A1+B1. These values are computed through multiplying circuits 50-1, 50-2, 50-3, 50-4 to give $(A1-B1)\,x1$, $(A1+B1)\,X1$, $(A1-B1)\,x2$ and $(A1+B1)\,x2$.

These values are compared with the output values of $w11$-$w21$ of the deduction circuit 47-1 in comparing circuits 51-1, 51-2, 51-3, 51-4. The comparing circuit 51-1 issues a signal from $fw1$ when $(A1-B1)\,x1 \leqq w$, wherein $w=w11-w21$. The comparing circuit 51-2 issues a signal $fw2$ when $(A1+B1)\,x1 \geqq w$. The comparing circuit 51-3 issues a signal $fw3$, when $(A1-B1)\,x2 \leqq w$. *The comparing circuit 51-4 issues a signal* $fw4$ when $(A1+B1)\,X2 \geqq w$.

When $$(A1-B1)\,x1 \leqq w \leqq (A1+B1)\,x1 \qquad (1)$$

is satisfied, an output signal $f1$ is obtained from an AND circuit 52-1. When $$(A1-B1)\,x2 \leqq w \leqq (A1+B1)\,X2 \qquad (2)$$

is satisfied, an output signal $f2$ is obtained from an AND circuit 52-2. When the formular (1) is not satisfied, and the formula (2) is satisfied, X=X2. When the formula (1) is satisfied, and the formula (2) is not satisfied, then X=X1. When both formulae are satisfied, this means that commodities of a quantity exceeding a limit of quantity have been taken out. On the other hand, when the both formulae (1), (2) are not satisfied, this means that another commodity having a different weight or a foreign matter is included.

Figure 13:
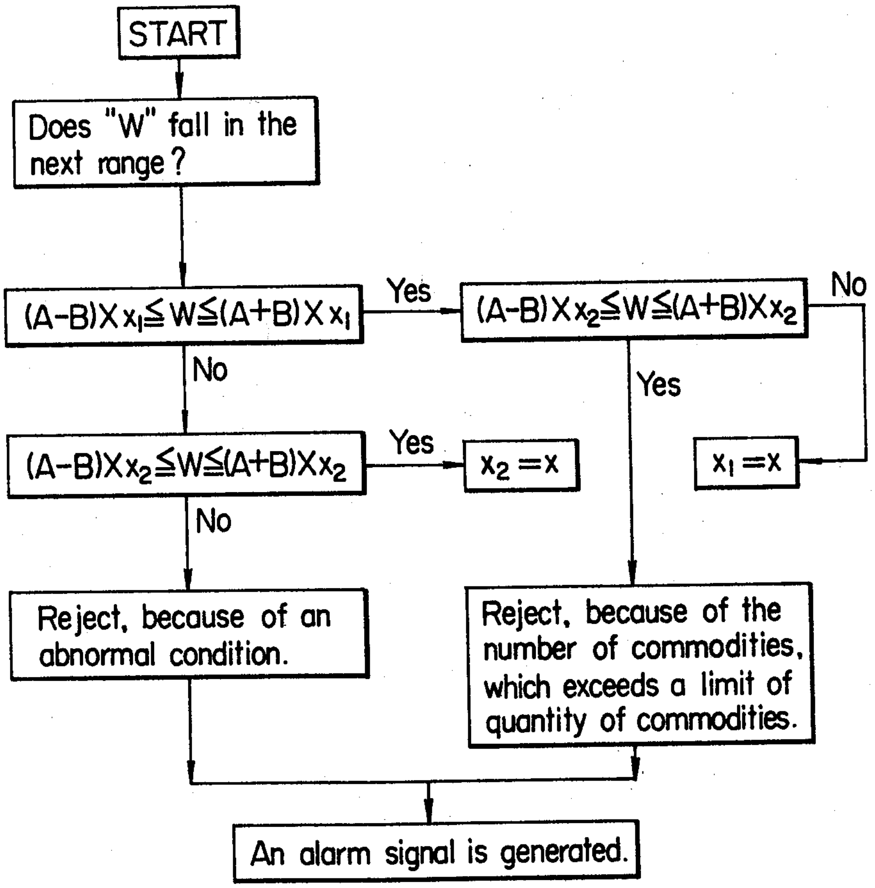
FIG. 13 is a flow chart illustrative of a shopping process.

According to a circuit of FIG. 38, output signals F11, F21, F31, and F41 are obtained through NOT circuits 53-1, 53-2, 53-4, 53-5, and AND circuits 52-3, 52-4, 52-5, 52-6, respectively; when an output signal F31 or F41 is issued, an alarm signal Fr is issued through OR circuits 54-1, 54-2, and AND circuits 52-8. When the alarm signal Fr is issued, then an alarm device 33 is actuated to give an alarm, whereupon a locking-signal-generating device 56 is actuated to prevent the withdrawal of a lock-releasing and storing medium T, i.e., a card from a card-inserting slit 2. The above mentioned process is shown in FIG. 13, as well.

On the other hand, signals F11, F21, F31, F41 obtained according to the aforesaid computation, and unitprice signals Pt, of the aforesaid commodities are both input into a storing-arithmetic circuit 57, where the quantity of commodities obtained by computation is multiplied by unit prices, so that a price signal is issued. When shopping has been completed and the door has been closed by a purchaser, then a drive signal *f*D is fed by way of an AND circuit 52-7 to a printer 59, so that an information from a reading circuit 58 is printed on a lock-releasing and storing medium or card T. Upon completion of printing, a completion signal *fe* is issued to actuate a release-signal-generating device 55, thereby permitting withdrawal of a lock-releasing storing medium or card T from its inserting slit. The presence of a card will actuate the release signal generator 60 to permit opening of the door 9, and correspondingly when the card is removed, the door 9 cannot be opened.

Figure 11:
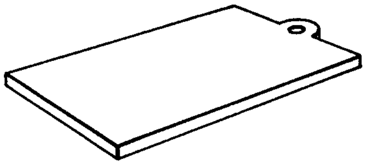
FIG. 11 is an outlook of a shopping card as used according to the present invention 1.

Description will now be given of a shopping procedure for a purchaser in a manless super-market, in which automatic vending machines according to the present invention are set, i.e., the procedure covering from the time when a purchaser selects a commodity until the purchaser makes payment. As shown in FIG. 7, a purchaser receives a shopping card shown in FIG. 11, at a shopping-card-receiving station 16 at the entrance of a market. Placed within the market are automatic vending machines as shown in FIGS. 4, 5, 6, which are shown as a group of automatic vending machines 18 in a plan view in FIG. 7. When a purchaser inserts a shopping card into a shopping-card-inserting slit 2 in an automatic vending machine, the door 9 will be free to open or close. Then, the purchaser opens the door 9 to take out commodities of a desired quantity from several display baskets 10, and then closes the door 9. In this manner, the purchaser has an opportunity to check commodities in her hands, and if the purchaser does not like the commodities, then the purchaser may return them to their home positions and select the other commodities. In FIG. 4, there is provided a shopping-completion-indicating device 14, in which, if a button is depressed, then the door 9 is closed. However, the door 9 may be so designed as to be manually closed, without using a button. In either case, when the door 9 is closed, then a shopping card is released from its locked condition, so that a purchaser may take the shopping card out of the inserting slit. Then the purchaser has completed shopping, then the purchaser inserts a shopping card at a counter 17 shown in FIG. 7. Then, an application comes out, based on sales-informations which have been recorded on the shopping card. The purchaser makes payment according to the application.

In this case, there are alternatives for a payment or accounting, i.e., an off-line system and in-line system. According to the off-line system, sales-informations such as identification number, quantity, unit price and total price of commodities purchased are magnetically stored on a shopping-card itself, and a purchaser is to bring the shopping card with her. When commodities 11 have been purchased, informations are magnetically stored on a shopping card. Then, the purchaser inserts a shopping card into a counter 17 positioned at the exit of a market, so that an application, on which sales-information has been recorded, comes out. Then, the purchaser makes payment based on the application. On the other hand, according to the in-line system, a number or symbol of a lock-releasing medium, i.e., a shopping card, key or plug is stored beforehand, and a purchaser brings the shopping card, key, or plug with her and inserts it into an inserting slit or hole for shopping. In this respect, description has been given thus far of a shopping card as a lock-releasing and storing medium. However, in the in-line system, a shopping card is not required to store informations and thus serves simply as a lock-releasing medium. After the completion of shopping, the purchaser inserts the shopping card, key, or plug into a counter 17 positioned at the exit of a market, whereupon there comes out an application, on which sales-informations are recorded in connection with the aforesaid lock-releasing medium. Then, the purchaser makes payment based on the application. The automatic vending machine according to the present invention may be applied to either of the off-line and in-line systems.

Figure 8:
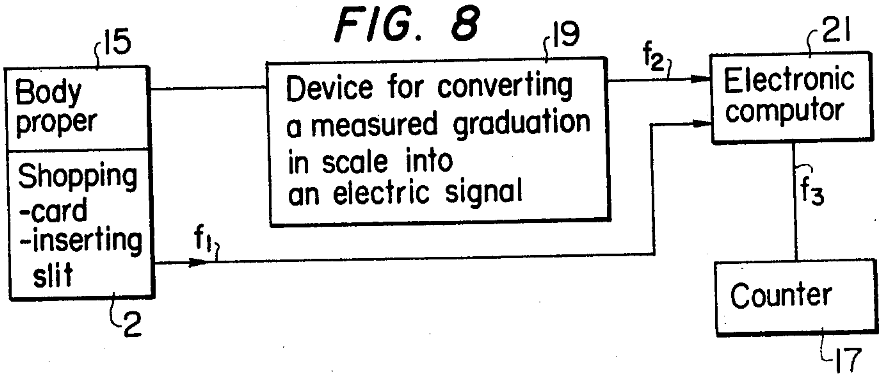
FIG. 8 is a block diagram showing the construction of an in-line system as used in the automatic vending machine according to the present invention.
Figure 9:
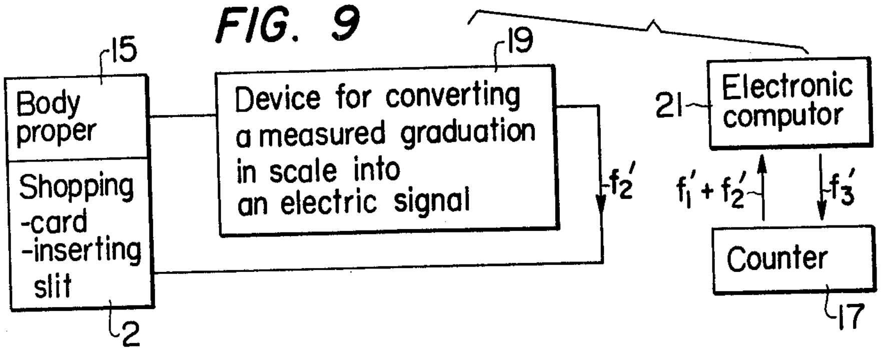
FIG. 9 is a block diagram showing an off-line system of the automatic vending machine according to the present invention.

In FIG. 8, there is shown a block diagram illustrative of the arrangement of the in-line system which is used in an automatic vending machine according to the present invention, and in FIG. 9, there is shown an arrangement of the off-line system according to the present invention. In passing, the aforesaid arrangements of circuits are known or can readily be inferred by those skilled in the art. A purchaser inserts a shopping card, in which a register number is entered, into a shopping-card-inserting slit 2 provided in the body proper 15 of an automatic vending machine. With the in-line system, as shown in FIG. 8, a register-number-designating signal *f*1 corresponding to a register number of a purchaser is issued so as to be fed into an electronic computor 21. After the purchaser has inserted a shopping card into the shopping-card-inserting slit 2, the purchaser opens a door in the body proper of the automatic vending machine and then takes out desired commodities therethrough. After the purchaser has taken out commodities, and then closes the door, then the weighing scale 12' is operated, whereupon weights before and after the removal of commodities or a balance in weight is converted into an electrical signal which is then fed as a signal *f*2 into the electronic computor 21, thereby providing sales-information of commodities. When the purchaser has completed shopping and inserted a shopping card into a shopping-card-inserting slit in a counter 17, then a signal *f*3 is fed from the electronic computor 21 to a counter, based on the aforesaid signals *f*1 and *f*2, so an application comes out. The purchaser makes payment according to the application.

On the other hand, with the off-line system, as shown in FIG. 9, a purchaser inserts a shopping card into the aforesaid shopping-card-inserting slit, and then opens a door on a body proper 15 of an automatic vending machine to take out desired commodities therethrough. When the purchaser has completed taking out commodities and closed the door, then a weighing scale 12' is operated, so that the weights before and after the removal of commodities or a balance in weight is converted into an electrical signal according to means 19 adapted to convert a measured graduation in the scale 12' into an electrical signal, and then the signal i.e., a sales-information is given to the shopping card as a signal *f2* as shown in (*a*). When the purchaser has completed shopping and inserted a shopping card into a card-inserting slit in a counter, a signal *f1* corresponding to a register number of the shopping card and the aforesaid signal *f2* are both fed to the electronic computor 21 as shown in (*b*), and then a signal *f3* is fed from the electronic computor 21 to a counter 17, so that an application is prepared. The purchaser makes payment according to the application.

Figure 10:
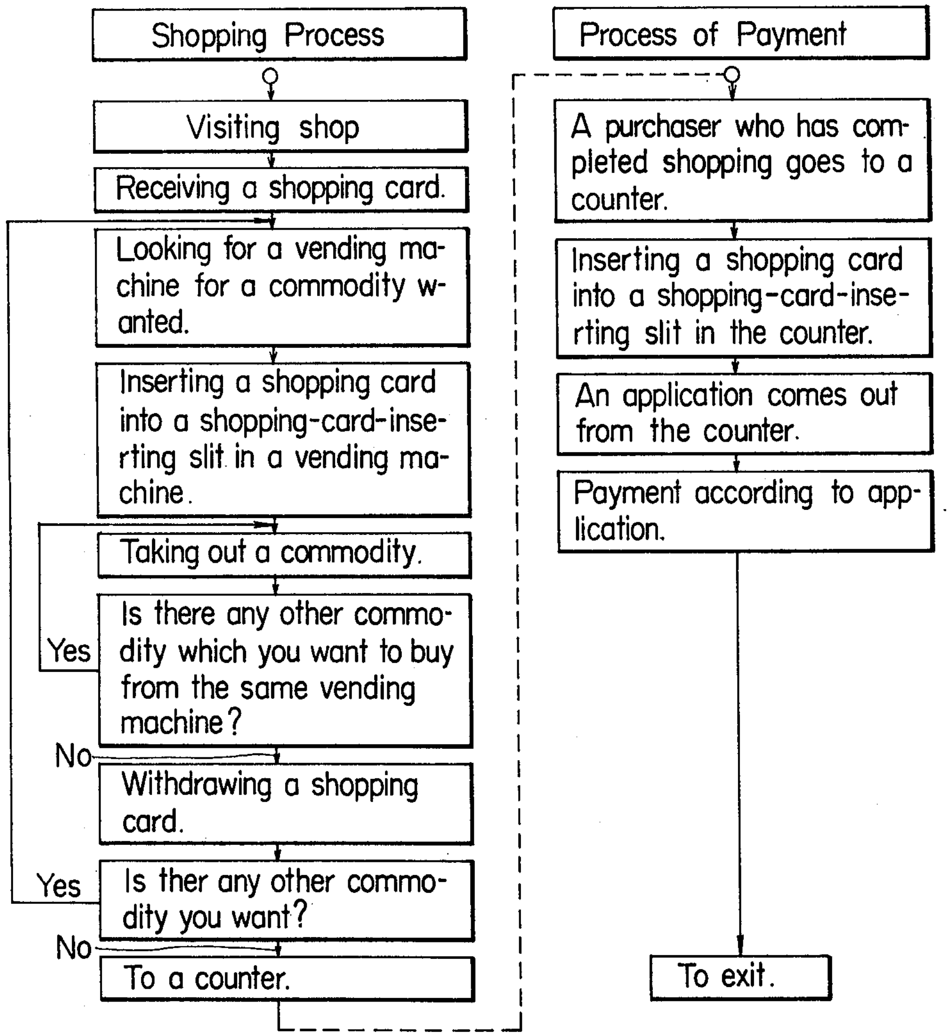
FIG. 10 is a system flow-chart indicating steps of purchasing commodities.

FIG. 10 shows a system flow-chart, following which a purchaser purchases commodities by using a shopping card in either off-line or in-line system of the automatic vending machines according to the present invention.

Figure 14:
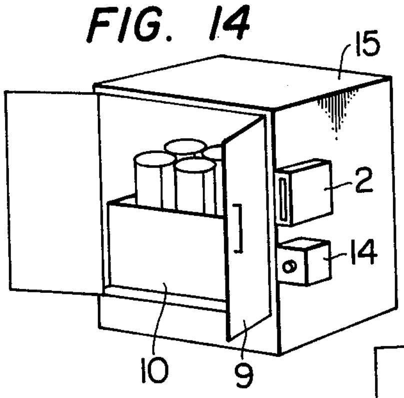
FIG. 14 is a perspective view of an automatic vending machine according to the present invention, which includes a single display basket.
Figure 15:
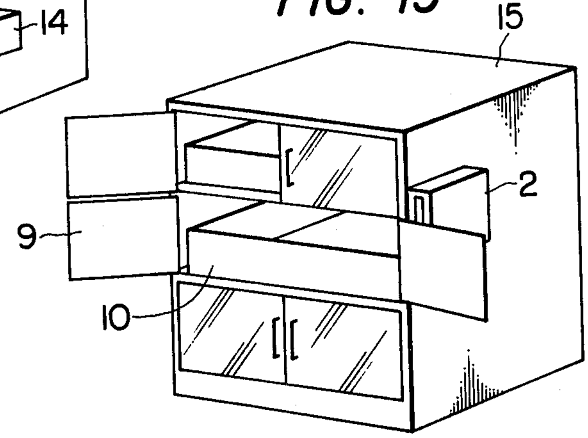
FIG. 15 is a perspective view of a machine having a door for each of display baskets.
Figure 16:
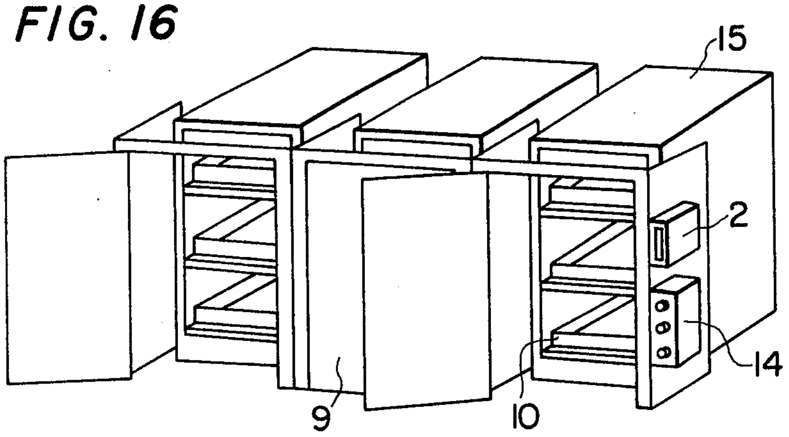
FIG. 16 is a perspective view of doors which are positioned apart from a body proper of the machine.

While description has been given of a plurality of display baskets used in the automatic vending machine, a single display basket may be used as shown in FIG. 14. Although the doors 9 are shown as having a pair of doors, a single door may be used. In addition, a door 9 may be provided for each of display baskets 10, as shown in FIG. 15. Still furthermore, the door 9 is provided in integral fashion with the body proper 15 of the machine, although the door should not necessarily be integral with the body proper. In other words, the doors may be provided independently of the body proper 15, with a partition wall positioned between the adjoining two automatic vending machines, as shown in FIG. 16. Yet furthermore, although the weighing scale 12 (12') is provided in the form of a spring type scale, other type scales may be used, such as for instance, a scale which uses an piezo-electric element such as a strain gage, or a semiconductor that issues a signal by sensing the variation in pressure or weight. Furthermore, the door 9 may be opaque. Yet furthermore, the aforesaid lock-releasing medium is provided in the form of a shopping card, key or plug. However, a coin may be used. In this case, commodities may be purchased according to the following procedure. When a purchaser inserts a coin into a coin-inserting slit 2, then a signal is fed into an electronic computor 21 for identification of the coin, whereupon a door 9 is released from its locked condition and thus becomes free to open or close. When the purchaser opens the door 9, takes out a commodity and closes the door 9, then the door 9 will be locked again. In this respect, the weight of a commodity 11 taken out is converted into an electric signal by means of a device adapted to convert a measured graduation in the weighing scale 12 into an electric signal, whereupon the electronic computor 21 computes the amount of commodities sold. In this case, there may be provided means for returning a change. On the other hand, an alarm device 22 may be provided so as to give an alarm when a quantity of commodity exceeds a quantity of commodities which may be purchased by using coins. In case a coin is used as a lock-releasing medium, the coin is once retained within the coin-inserting slit, after which a commodity is taken out and the door 9 is closed, and then the coin starts dropping through the inserting slit 2 into a coin retaining box. Manipulation to drop a coin through the inserting slit 2 is similar to that to release the lock-releasing medium from the inserting slit 2 so as to take same out.

The aforesaid description refers to a lock-releasing medium which integrally consists of a lock-releasing medium and a storing medium for use with an off-line system. However, the lock-releasing medium may be independent of the storing medium, and, in this case, means for admitting the lock-releasing medium and means for admitting the storing medium may be provided separately of each other. Still furthermore, there may be provided means for locking the lock-releasing medium and storing medium, while the door 9 is maintained opened. Furthermore, a storing medium alone may be used in place of the aforesaid lock-releasing medium, and the lock-releasing medium and storing medium.

In this case, means for admitting the storing medium alone is provided in a manner that, for instance, when the storing medium has been admitted and then a door thus released is opened, then the storing medium may be locked so as not to be removed, during the time in which the door is maintained opened; and a commodity information is fed or input into the storing medium, while the storing medium may be taken out when the door 9 is closed. In addition, the door 9 is provided in the aforesaid description. However, there may be provided a weighing scale, means for converting a numerical value corresponding to a quantity of commodities taken out, into an electrical signal, and means for admitting a lock-releasing and storing medium, without using the aforesaid door 9. In this case, when the lock-releasing and storing medium is admitted and commodities are taken out, then means for converting into an electrical signal is actuated, so that commodity-informations may be fed in the lock-releasing and storing medium. In addition, there may be provided locking means which precludes the removal of the lock-releasing and storing medium, unless a commodity-information is fed into the lock-releasing and storing medium. Still furthermore, there may be provided means for indicating the completion of shopping, which precludes the removal of the lock-releasing and storing medium, unless as indication for completion of shopping is given. Alternatively, as has been described earlier, there may be provided a lock-releasing medium or a storing medium alone or the both thereof in place of the aforesaid lock-releasing and storing means. In the aforesaid description, there are provided means for admitting the door 9, and a lock-releasing and storing medium, in addition to communicating means for issuing an alarm signal and a notifying signal. However, an automatic vending machine may be composed of a weighing scale, means for converting a numerical value corresponding to a quantity of commodities taken out, into an electrical signal, and means for communicating, without providing the door 9 and means for admitting a lock-releasing and storing medium and the like. For instance, in case commodities of a quantity exceeding a predetermined maximum quantity are to be taken out or a foreign matter is to be placed in a retaining vessel, then a variation in weight may be sensed to thereby notify such a condition.

Figure 17:
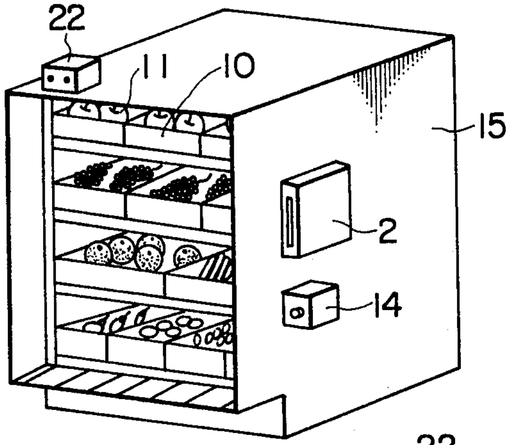
FIG. 17 is a perspective view showing the second embodiment of the automatic vending machine according to the present invention.
Figure 18:
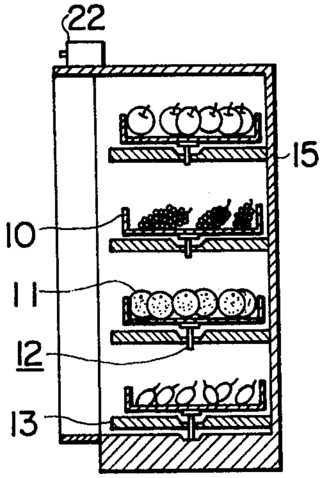
FIG. 18 is a transverse cross-sectional view of the machine of FIG. 17.

FIG. 17 is a perspective view showing the second embodiment of the automatic vending machine according to the present invention. FIG. 18 is a transverse cross-sectional view thereof. The vending machine includes a body proper 15, in which there are provided shelves 13 of a stage form, weighing scales 12 positioned contiguous to the shelves 13, respectively, and display baskets 10 containing foods and daily necessaries such as cans, fruit, dental creams and the like, i.e., commodities 11. In this respect, the basket 10 may contain one or more commodities.

As shown in FIG. 17, an external side-surface of the body proper 15 is equipped with a shopping-card-inserting slit 2 and means 14 for indicating completion of shopping. Placed on top of the body proper 15 is an alarm device 22 including a beam source for issuing beams, a beam-receiving portion, an alarm buzzer and the like. No door is provided in the front of the body proper 15, while beams from the alarm device 22 form a so-called beam screen which covers the front of the door in every direction. The beam screen serves to issue an alarm when a purchaser makes access to commodities unlawfully or inadvertently, without inserting a shopping card in the shopping-card-inserting slit 2.

Figure 19:
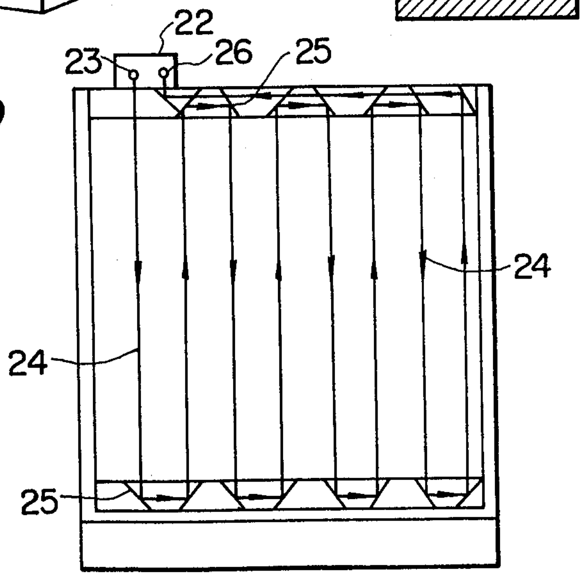
FIG. 19 is a view showing paths of light beams advancing.
Figure 20:
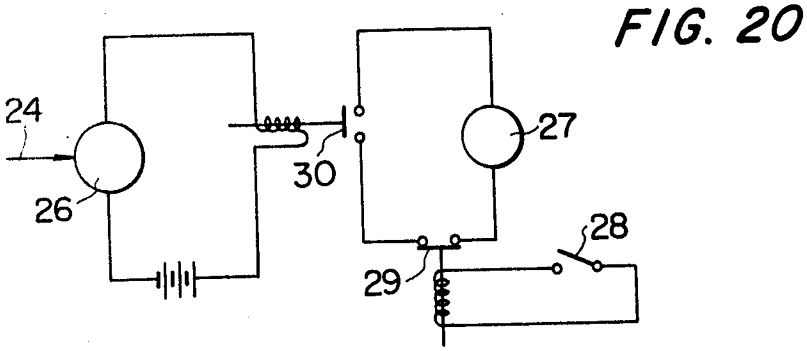
FIG. 20 is an alarm circuit diagram.

Description will now be turned to the alarm device 22 mounted on top of the body proper 15. FIG. 19 is an outline of an example, showing a condition of beams advancing. FIG. 20 shows an alarm device circuit, in case a shopping card is not inserted into a shopping-card-inserting slit 2. As shown in FIG. 19, the alarm device 22 is equipped with a beam source 23 and a beam-receiving portion 26 as well as an alarm circuit as shown in FIG. 20. Shown at 24 is a light beam issued from the beam source 23, at 25 reflecting mirrors which reflect beams 25 in a manner to direct the beams 24 to the beam-receiving portion 26. With the aforesaid arrangement, a beam 24 issued from the beam source 23 is directed downwards, as shown, so as to reach the reflecting mirror 25 positioned below, where the beam is reflected to reach the reflecting mirror 25 adjoining thereto on its right side, then directed upwards to reach the reflecting mirror positioned above. In this manner, the beam is directed up and down between mirrors to form a beam screen in the entire front of the body proper 15. In this respect, for better understanding, reflecting mirrors are provided in the vertical direction i.e., in an upper row and a lower row. However, mirrors may be provided in the horizontal direction. The beam thus forming a beam screen eventually reaches the beam-receiving portion 26. The beam-receiving portion 26 is provided in the form of a photo-sensitive element, such as a cadimium-sulfide cell and the like. Shown at 27 in FIG. 20 is an alarm buzzer, and at 28, 29, 30 are switches, respectively. The insertion of a shopping card by a purchaser brings the switch 28 to its on-position, while the switch 29 maintaining its on-position is turned to its off-position, so the alarm buzzer 27 is maintained inoperative. (However, access by hands of a purchaser shields the beam 24 which is directed to the beam-receiving portion 26, while the switch 30 maintaining its off-position is turned to its on-position.) When a purchaser inserts a shopping card into a shopping-card-inserting slit 2 in this manner, the purchaser may take commodities, without trouble. Meanwhile, in case a purchaser makes access by hands to commodities, without inserting a shopping card into the slit 2, i.e., in the case of an unlawful act or inadvertent act of the purchaser, beam 24 is interrupted and does not reach the beam receiving portion 26, whereupon the switch 30 maintaining its off-position is turned to an on-position, and the switch 29 is maintained in its on-position, so that an alarm is given by the alarm buzzer 27. When the purchaser takes out commodities, without inserting a shopping card into the shopping-card-inserting slit 2, the alarm buzzer will be immediately actuated, thereby preventing an unlawful act beforehand. Description has been given thus far of an example, in which the beam source 23, and beam-receiving portion 26 are mounted on top of the body proper 15 of an automatic vending machine and the beam 24 is directed in the vertical direction so as to form a beam screen. However, the direction of beam 24 may be horizontal, slantwise or the like, as far as there is formed a beam screen in the entire front of the body proper 15, and the beam thus directed may eventually reach the beam-receiving portion 26, with the beam source 23, beam receiving portion 26 and reflecting mirrors 25 being so positioned as to meet the aforesaid requirement. In addition, the beam source 23, beam-receiving portion 26 and an alarm circuit should not necessarily be positioned in a common position, but may be separated from each other independently. Still furthermore, the alarm buzzer 27 is built in the alarm device 22 in this instance. However, the buzzer 27 may be separated from the alarm device 22. The beams emitted from the beam source 23 should not necessarily be visible beams but may be invisible infrared rays or ultraviolet rays. The aforesaid arrangement is such that the alarm buzzer 27 provided on the alarm device gives an alarm, in case the paths of beam 24 are interrupted or shielded, without following a predetermined procedure. However, a screen or shutter may be provided in the front of the automatic vending machine, in addition to the aforesaid alarm device 22, so that the moment an alarm is given by the alarm buzzer 27, the screen or shutter may be closed. Alternatively, the alarm buzzer 27 may be omitted but the aforesaid screen or shutter alone may be closed in the aforesaid unlawful events.

Figure 21:
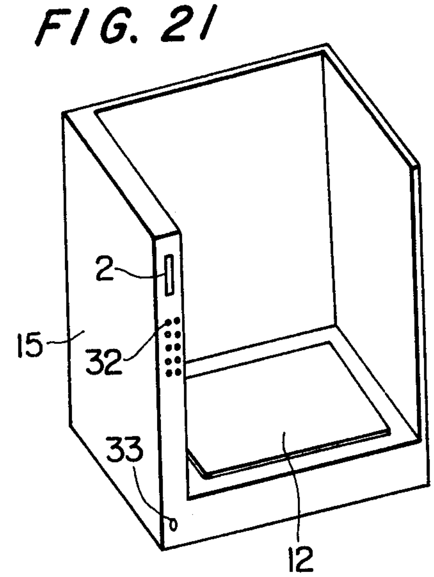
FIG. 21 is a perspective view of the third embodiment of the automatic vending machine according to the present invention.
Figure 22:
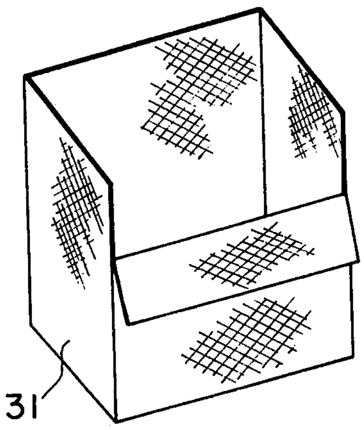
FIG. 22 is a perspective view showing a container to be placed in the automatic vending machine of FIG. 21.
Figure 23:
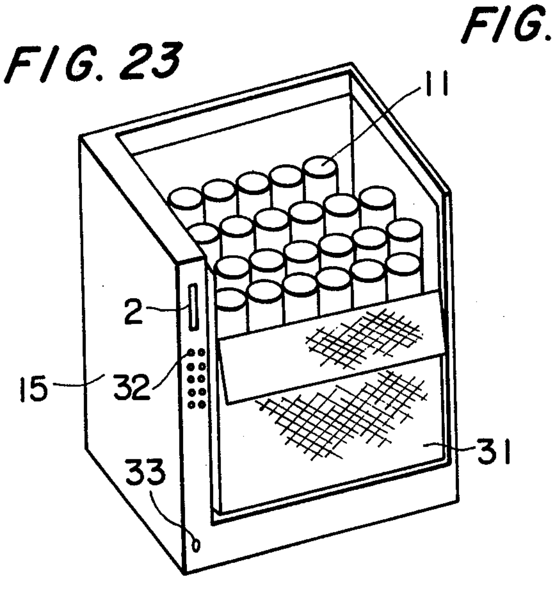
FIG. 23 is a perspective view showing a condition of the container placed in the automatic vending machine of FIG. 21.
Figure 24:
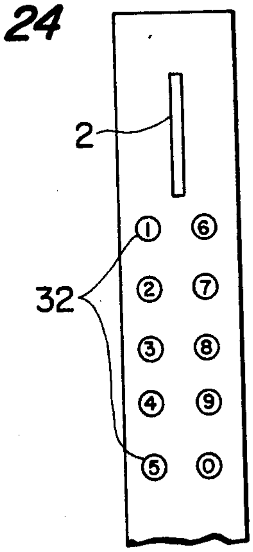
FIG. 24 is a view illustrative of a number-of-commodities indicating device.

FIG. 21 is a perspective view showing the third embodiment of the automatic vending machine according to the present invention. FIG. 22 is a perspective view of a container to be placed in the automatic vending machine of FIG. 21. FIG. 23 is a perspective view of a container which is placed in the automatic vending machine of FIG. 21. Shown at 11 are commodities, at 15 a body proper of the automatic vending machine, at 12 a weighing scale which weighs commodities housed in a container 31. The weighing scale 12 includes a weighing mechanism 12' as shown in FIG. 12. Shown at 2 is a shopping-card-inserting slit and at 32 a number-indicating device which indicates the number of desired commodities. Shown at 33 is means for notifying an unlawful act or error, for instance, an alarm device which gives an alarm in case a foreign matter different from commodities 11 retained in the container 31 is placed within the container 31, or commodities of a number which is different from that of commodities indicated at the number-indicating means 32 are taken out, or in case commodities 11 are taken out without inserting a shopping card into the slit. FIG. 24 is a view explanatory of the number indicating device 32. In general, a number indicating device of a button type is popular, as shown. This is referred to as "a ten key" system, in which a number is indicated according to a combination of 10 figures covering from 0 to 9. When a purchaser depresses a button desired times which correspond to the number of commodities 11 desired, the depressing motions are converted into electrical signals.

With the automatic vending machine according to the present invention, of the aforesaid arrangement, payment is made according to the following procedure. Assume now a number *a* of commodities, which have been indicated by the number indicating device 32, an average weight of $b$ grams per commodity 11, the maximum error weight ($\pm c$ grams) per commodity 11, a weight reduced ($d$ grams) due to removal of commodities 11, a number ($x$) of commodities sold which has been calculated, based on a reduced weight of commodities 2, a number ($y$) of commodities which have been indicated on the number-indicating device 32 but not taken out, and a number ($z$) of commodities which have been taken out without inserting a shopping card into a shopping-card-inserting slit 2 or a number of commodities which exceeds the number of commodities indicated. Then, when commodities 11 are purchased, a number ($a$) of commodities sold is fed for each purchaser. Meanwhile, in case a number of purchaser are present in a market and thus purchasing is continuously carried out one after another, then scales should be continuously operated. In such a case, $a$ will be input in cumulative fashion, until the scale 12' is brought into a stationary condition. The cumulative value $\Sigma a$ is compared with $x$ which has been determined based on a difference between the weight of commodities 11 before removal of commodities 11 in a stationary condition of the scale 12', and the weight of commodities measured in the subsequent stationary condition of the scale 12' after removal of commodities, and thus whether a proper purchase of commodities has been made is determined.

Regarding a positive number which satisfied $d/(b-c) \geqq x \geqq d/(b+c)$ and is obtained from the scale 12', and a cumulative value $\Sigma a$ obtained from the number-indicating device 32;

(a) If $x = \Sigma a$, this indicates the fact that a proper purchase has been made, and no alarm will be given.

(b) If $x < \Sigma a$, $\Sigma a - x = y$, a notifying signal is issued, reporting the fact that commodities have not been taken out, and if required, an alarm signal is issued to given an alarm.

(c) If $x > \Sigma a$, then $x - \Sigma a = z$. Then, a notifying signal is issued to notify the fact that a shopping card has not been inserted, or commodities of a number exceeding an indicated number have been taken out. If required, an alarm signal may be issued.

In addition, if a positive number $x$ is not present, which satisfies $d/(b-c) \geqq x \geqq d/(b+c)$, this means that a foreign matter is included. A communicating signal notifying this fact or if required, an alarm signal will be issued, warning inclusion of a foreign matter.

A notifying signal or an alarm signal is issued in case commodities of a number exceeding an indicated number have been taken out. However, when commodities of a number exceeding a predetermined maximum number have been taken out, or an indicated number exceeds the maximum number of commodities to be taken out, a notifying signal or an alarm signal may be issued.

Meanwhile, in case the value $x$ may take at least two positive numbers, due to the maximum error weight per commodity, then $x$ is so predetermined as to take either one of a small positive number, large positive number and a number intermediate between the two. Thus, an expected error number (For instance, if there are two positive numbers and then a larger number is adopted, there is a possibility that $x$ is more than $a$ by one.) is reported and, if required, an alarm signal is issued.

Meanwhile, the aforesaid description refers to an alarm device 33 serving as means for notifying an unlawful purchase or mistakes in purchasing commodities. However, the alarm device should not necessarily be limited to those using an alarm buzzer or a red flashing lamp and the like, but there may be used a communicating device to notify employees of unlawful acts or errors in an identification number of a purchaser, errors in the number of commodities and the like. In addition, an alarm device or means for notifying such facts to employees is provided in the body proper 15 of the vending machine. However, such an alarm device and the like may be provided in a specific place such as at a counter 17, rather than in the body proper 15. In addition, in the event of an unlawful act or other mistake, an instruction signal may be issued to the electronic computor 21 so as to distinguish the identification number of a purchaser in question from those of the other purchasers, such as by putting an asterisk only on the aforesaid identification number in question. In this case, a person at the counter 17 may concentrate his or her effort and attention in checking for a purchaser relating to such a specific application, thus saving man power at the counter 17.

Furthermore, a ten-key type push button is provided in the number-indicating device 32 which indicates a quantity of commodities purchased. However, a single push button may be provided in an automatic vending machine, so that each depression of a push button represents purchasing of one commodity. Thus, if commodities of a number $n$ is to be purchased, then the button may be pushed $n$ times. Otherwise, one commodity may be taken out by depressing a push button once, and then another commodity may be taken out by further depressing the push button, until commodities of a number of $n$ may be all taken out. Still furthermore, one commodity may be taken out by inserting a lock-releasing or storing medium, or a combination thereof into an inserting slit 2, and if two or more commodities are required, then the aforesaid push button system may be used. Yet furthermore, the push button may be replaced by a dial system, as far as a quantity of commodities may be indicated.

Figure 25:
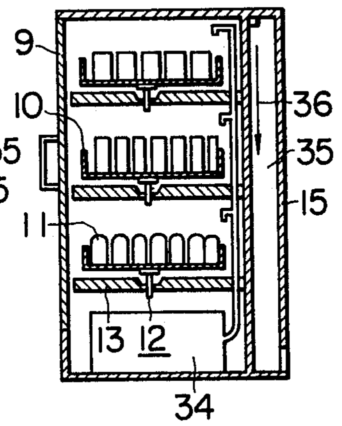
FIG. 25 is a transverse cross-sectional view of the fourth embodiment of the automatic vending machine according to the present invention.

FIG. 25 is a transverse cross-sectional view of the fourth embodiment of the automatic vending machine according to the present invention. With the automatic vending machine of this type, when a shopping card is not inserted into a shopping-card-inserting slit (not shown), a door 9 remains closed tightly. However, the moment a shopping card is inserted into the inserting slit, the door is released from its locked condition and thus becomes free to open and close. In this respect, if the door 9 is opened, the shopping card is locked and thus may not be taken out from the shopping-card-inserting slit. In addition, when the door 9 is closed, the shopping card whose sales-information has been fed into an electronic computor may be taken out from the slit freely. Shown at 11 are commodities to be housed in an automatic vending machine, such as for instance, cans, meat and the like, which are retained within display baskets 10 that are respectively supported on shelves 13 in a stage fashion within a body proper 15 of the machine. Shown at 12 is a weighing scale which is adapted to detect the weights of commodities before and after the removal of commodities, and the weighing scale 12 includes a weighing mechanism 12'. Shown at 34 is a commodity-storing mechanism which maintains commodities at a given temperature, i.e., a refrigerator, at 35 a space provided in the rear portion of the body proper 15, and at 36 an air curtain covering the front of the space 35.

Figure 26:
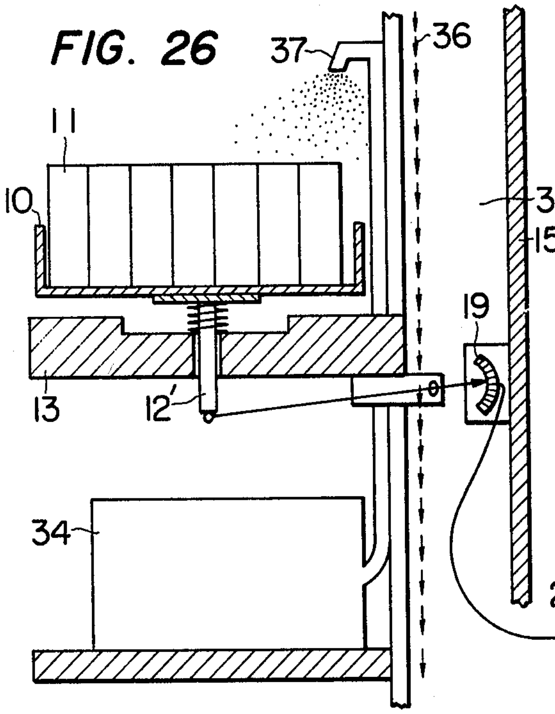
FIG. 26 is an outline showing an arrangement of a weighing scale.
Figure 27:
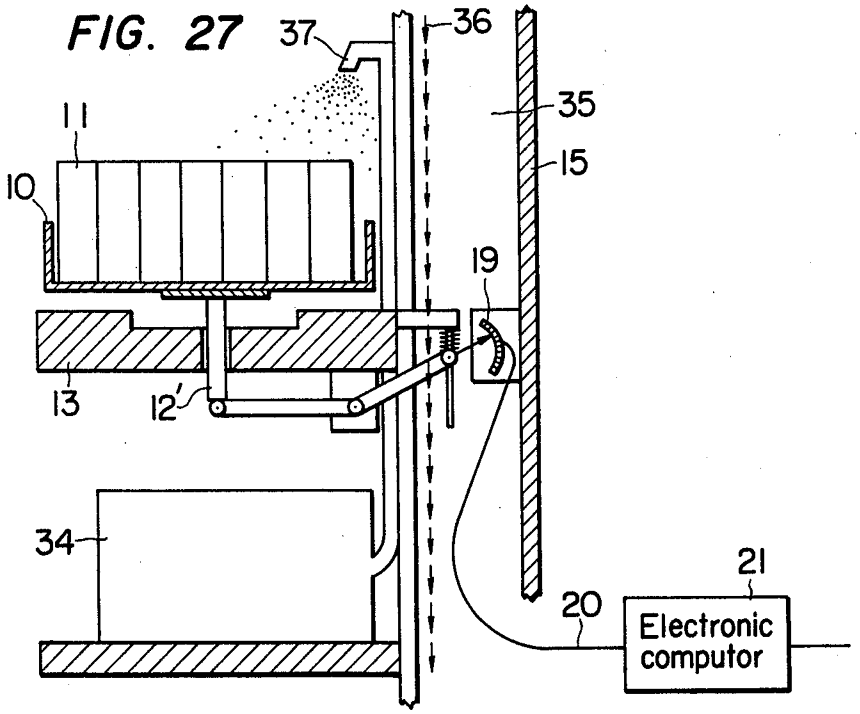
FIG. 27 and FIG. 28 are outlines of the arrangements of weighing scales which are different from that shown in FIG. 26.
Figure 28:
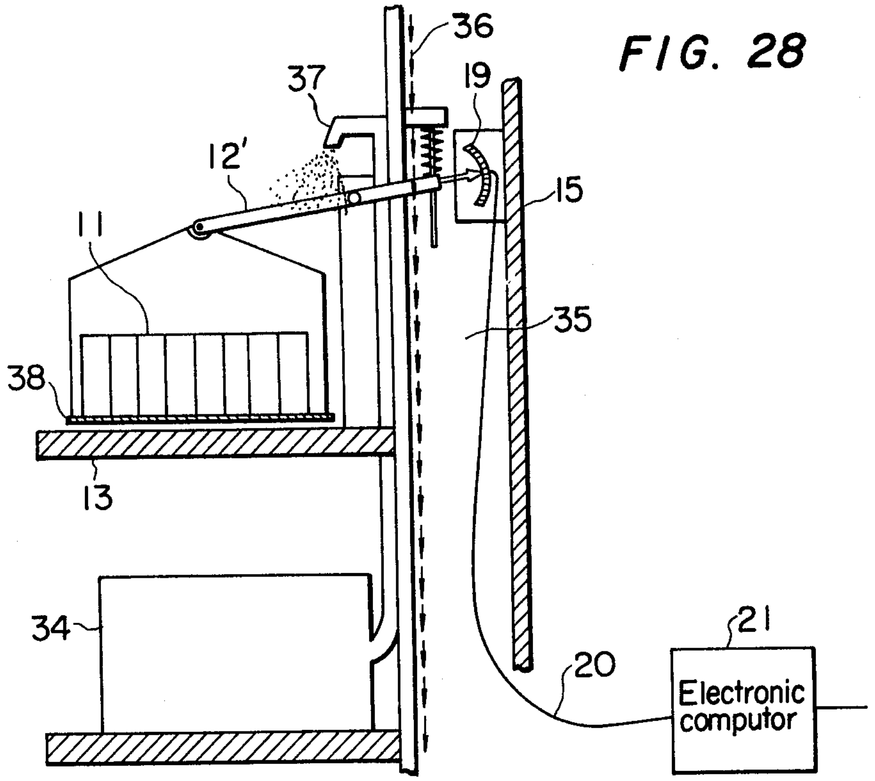

Description will be turned to a weighing scale 12 which forms the essential part of an automatic vending machine according to the present invention. FIG. 26 is an outline of an arrangement of the weighing scale 12. As shown, a scale 12′ is provided contiguous to the shelf 13 and sharply responds to the variation in weight of commodities in a display basket 10 placed on top of the scale 12′. On the other hand, means 19 for converting a measured graduation in the scale 12′ into an electrical signal is positioned at the tip of a pointer of the scale 12′ in the rear space 35 of the body proper 15 as in a manner of a potentiometer. A signal line 20 connected to the aforesaid means 19 is then connected to an electronic computer 21. Cool air from the refrigerator is fed through a discharge port 37 into the interior of the body proper 15 of the machine. However, if the means 19 for converting a graduation into an electrical signal is positioned in a sub-zero range, then there tends to take place troubles in the means 19, so that the means 19 should be provided outside of the aforesaid sub-zero range, while the space 35 housing means 19 therein should be thermally insulated with an air curtain 36, so that the space 35 may be maintained at an optimum temperature which precludes troubles arising in means 19. FIGS. 27 and 28 show outlines of an arrangement of a scale 12 of another type for use in the automatic vending machine described. A spring positioned below the display basket in FIG. 27 and above a display dish 38 in FIG. 28 is positioned in the space 35 covered with air curtain 36, rather than directly below the display basket 10 or a dish 38 respectively. With the aforesaid arrangement, the spring may be protected from direct influence of the refrigerator, and thereby a further improved accuracy may be achieved.

In addition, the door 9 as referred to in the aforesaid description may be replaced by a shielding member such as an air cushion which is provided in addition to means for locking a shopping card.

Figure 29:
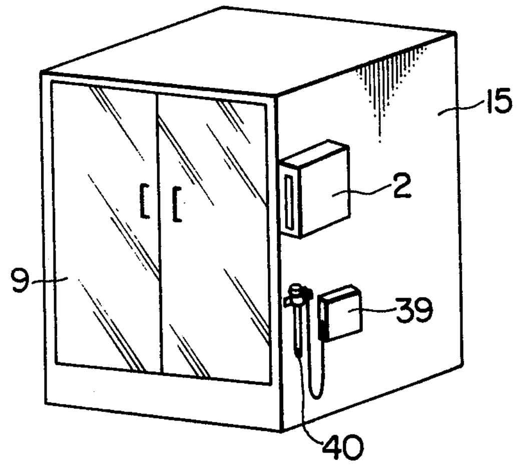
FIG. 29 is a perspective view of the fifth embodiment of the automatic vending machine according to the present invention.
Figure 30:
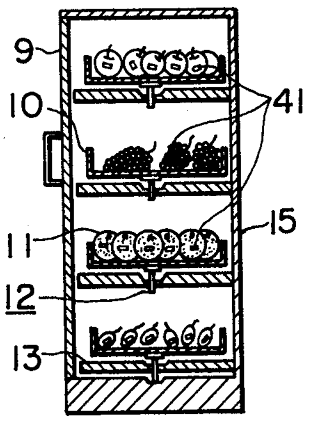
FIG. 30 is a transverse cross-sectional view of the automatic vending machine of FIG. 29.
Figure 31:
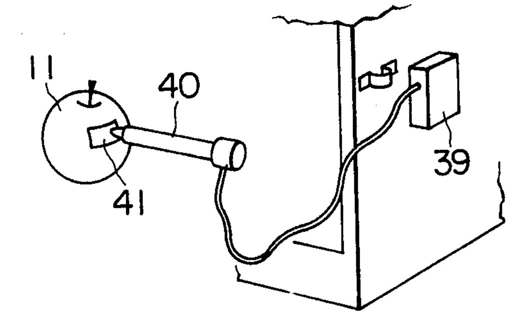
FIG. 31 is a view explanatory of a reading device.

FIG. 29 is a perspective view of the fifth embodiment of the automatic vending machine according to the present invention. FIG. 30 is a transverse cross-sectional view thereof, and FIG. 31 is an explanatory view of a reading device equipped in the automatic vending machine according to the present invention.

A door 9 is provided in this automatic vending machine, as well. The door 9 is maintained closed tightly, when a shopping card is not inserted into a shopping-card-inserting slit 2. Once a shopping card is inserted into the shopping-card-inserting slit 2, then the door 9 will be free to open or close. In this respect, when the door 9 is opened, a shopping card is so designed as to be locked within the shopping-card-inserting slit 2, so that the shopping card can no longer be taken out. Shown at 11 are commodities having varying weights, unlike foods or daily necessaries such as cans, fruit, dental creams, meat, and the like, whose unit commodity weighs constant. Shown at 10 is a display basket retaining commodities 11 therein, at 13 are shelves provided within the body proper 15 in a stage fashion, at 12 a weighing scale which detects the weights of commodities before and after removal of commodities 11, the weighing scale 12 including a weighing mechanism 12′ therein. Shown at 39 is a reading device in which informations recorded on labels attached to commodities 11 (Identification number, weight, price and the like of commodities are entered thereon.) are read by an optical means, such as a light pen 40, so that commodity informations may be converted into electrical signals. According to this system, even if a purchaser takes out a commodity 11 and closes the door 9, unless the label 41 is read, a shopping card remains locked within the shopping-card-inserting slit 2. If the light pen 40 is brought into contact with the label 11 attached to commodity taken out, then the reading device 39 will be actuated in a manner that the weight of a commodity of commodity informations is compared with a value measured by the scale 12, and then if the two values are in accord, sales-information is input into a shopping card, which is turn becomes free to take out. On the other hand, if the two values are found to be different according to the aforesaid comparison, a shopping card can not be taken out, whereupon an alarm signal will be issued. (A device for issuing an alarm signal is not shown.)

Meanwhile, description has been given of the reading device 39 in the form of a light pen 40. However, another optical character-reading system, a magnetic record reading system, or a perforation type record-reading system may be used, as far as records such as identification number, weight, price and the like of a commodity may be read and converted into an electrical signal. Still furthermore, the light pen 40 may be brought into contact with the label 41 attached to a commodity, after the door 9 has been closed, or the light pen 40 may be brought in touch with the label 41, with the door 9 kept open, after which informations are read by the reading device 39, followed by closure of the door 9.

Figure 32:
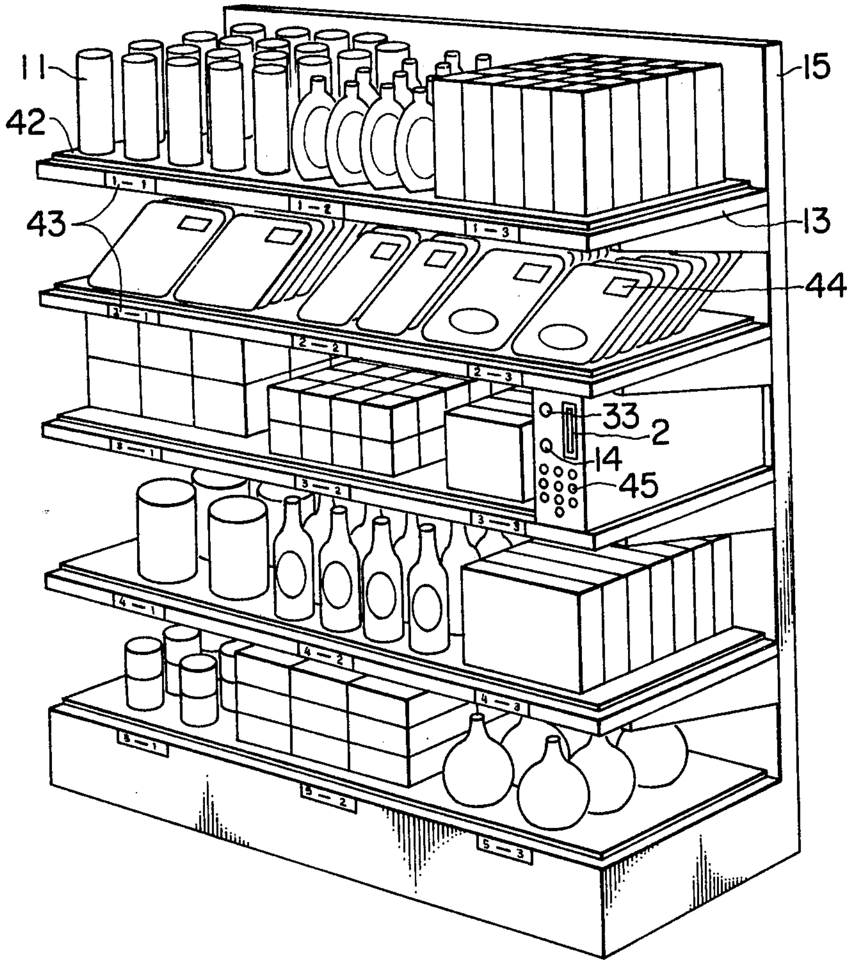
FIG. 32 is a perspective view of the sixth embodiment of the automatic vending machine according to the present invention.
Figure 33:
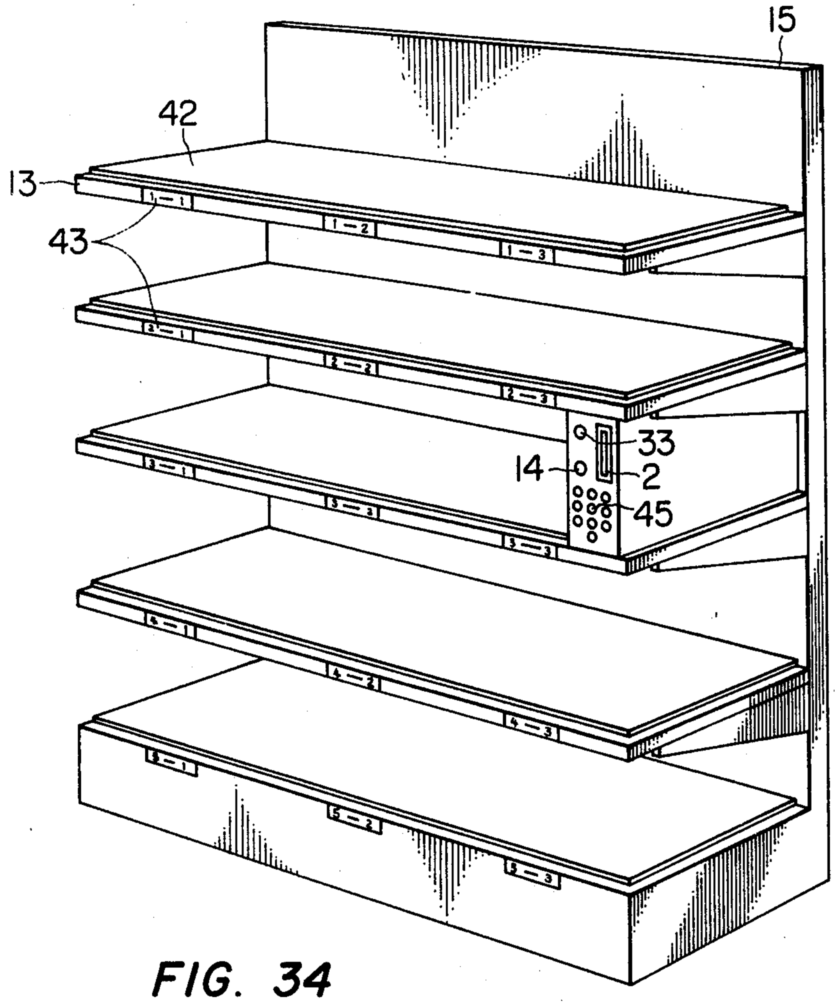
FIG. 33 is a perspective view showing the vending machine of FIG. 32, with commodities removed therefrom.

FIG. 32 is a perspective view of the sixth embodiment of the automatic vending machine according to the present invention, and FIG. 33 is a perspective view of the machine, from which commodities are shown omitted for better understanding of the invention. Shown at 42 is a retaining plate which retains commodities thereon, at shelves 13, on which the retaining plates are placed. A symbol such as 1-1 is shown in the drawing, and this is alotted for a predetermined kind of commodities 11, thus designating its location as at a position symbol 43. Alternatively, an identification number may be used in place of a position symbol, or serial numbers may be used as identification numbers for commodities. As shown in FIG. 32, three different kinds of commodities 11 are placed on a shelf 13 designated by a number 1, and serial numbers of commodities are shown as at 1-1, 1-2, 1-3.

In addition, each unit commodity of these three kinds of commodities is substantially constant in weight, and thus these may be counted by using a unit of 'piece' rather than the weight, for convenience of payment. On the other hand, three different kinds of commodities 11 are placed on a second stage shelf 13, as well, with position symbols being attached in the same manner as in the first stage shelf. However, commodities 11 placed on the shelf No. 2 are varying in their weights, such as meat and the like. Accordingly, commodities of this kind can not be counted by using a unit of 'piece'. Thus, the commodities are weighed beforehand, and then their weights and prices are entered in a label 44, respectively, as shown. Shown at 45 is a position-and-quantity-of-commodity indicating device, by which a purchaser designates a commodity 11 by using a position and identification number of a commodity, and which indicates a quantity of commodities purchased. So, the purchaser should only push a button at times corresponding to the position symbol 43 and a quantity of commodities wanted, so that electrical signals will be fed into an electronic computer. More particularly, when the first commodity 11 placed on a shelf No. 1 is purchased, then a push button marked with 1 in the position-and-quantity-of-commodity indicating device 45 should be depressed two times, commensurate to the position symbol 1-1, and then a push button having a number corresponding to a quantity of commodities wanted is depressed. In addition, in case a third commodity 2 on a shelf 13 on the second stage at a position symbol of 2-3 is to be purchased, push buttons marked with 2 and 3 are depressed, and then a push button carrying a number corresponding to the weight indicated on a label 44 is depressed. Shown at 14 is a shopping-completion-indicating device, which is adapted to indicate the completion of shopping by means of push buttons, while this information is fed as an electrical signal to an electronic computor. The shopping-completion-indicating device 14 is so designed that, upon completion of shopping, unless a push button provided in the shopping-completion-indicating device 14 is depressed, a shopping card locked within the shopping-card-inserting slit can not be taken out. Shown at 33 is means for notifying an unlawful act or mistakes, for instance, an alarm device.

Figure 34:
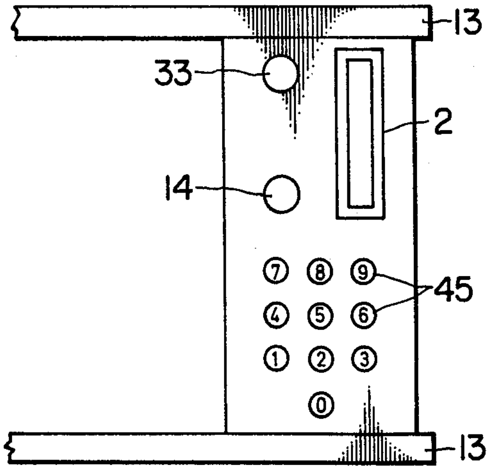
FIG. 34 is a view explanatory of a position-and-quantity-of-commodity-indicating device.

Although not shown, a weighing scale of the aforesaid type is provided in this automatic vending machine. FIG. 34 shows an outline of a position-and-quantity-of-commodity-indicating device 45. As shown, push buttons used in the position-and-quantity-of-commodity-indicating device are of the so-called "ten-key" type, and marked with ten figures of 0 to 9, thereby indicating position, indentification number, quantity and weight of commodities to be purchased.

With the automatic vending machine of the aforesaid arrangement, determination whether proper purchasing has been carried out, as well as a notifying action will be made or taken in the following manner. Before going further, description will be first given of a case where commodities to be purchased are items each providing a given weight, and then of a case where commodities to be purchased are items providing varying weights.

Referring to the first case, assume that a purchaser wants to buy commodities at position symbols 1-1 and 1-3; a quantity of commodities indicated at the position-and-quantity-of-commodity-indicating device 45 are $a1$ and $a3$, respectively; average weights of commodities, per piece, are $b1$ and $b3$, respectively; the maximum error weights of commodities, per piece, are $\pm c1$ and $\pm c3$, respectively; and a weight reduced due to removal of commodities is $d$. Then, the quantity of commodities indicated at the position-and-quantity-of-commodity-indicating device 45 is compared with a value measured by a weighing scale, to thereby determine whether a proper purchasing has been carried out.

In the following formula:

$$(b1-c1)a1+(b3-c3)a3 \leqq d \leqq (b1+c1)a1+(b3+c3)a3,$$

(a) if $d$ satisfies the above formula, this means that a proper purchasing has been carried out, so that a shopping card may be freely taken out from a shopping-card-inserting slit 2, while no alarm will be given.

(b) if $d$ fails to satisfy the above formula, then this means that (1) a foreign matter is included, (2) commodities not indicated have been taken out, (3) commodities indicated have not been taken out, (4) commodities different from commodities indicated have been taken out, or (5) commodities of a quantity different from the quantity indicated have been taken out.

In these above cases, a notifying signal or, if required, an alarm signal is issued for notifying these facts, with a shopping card retained within the shopping-card-inserting slit.

(c) In addition, in case a variation in weight is measured by a weighing scale, in the absence of a shopping card in the shopping-card-inserting slit 2, then a notifying signal which notifies this fact, or, if required, an alarm signal will be issued.

(d) In case an indication represents a quantity which exceeds a quantity of commodities 11 retained actually, a notifying signal is issued, and if required an alarm signal is issued for notifying a purchaser of shortage of commodities wanted.

(e) In case the maximum quantity of commodities to be taken out by a purchaser at one time is predetermined, if an indication is given as a value exceeding a quantity thus predetermined, then a notifying signal is issued, instructing that commodities should be purchased twice, with a shopping a card locked within a shopping-card-inserting slit 2.

Referring to the second case where commodities provide varying weights, assume that: a purchaser wants commodities shown at position symbols 2-1 and 2-2 one for each; a quantity of commodities is shown at a position-and-quantity-of-commodity-indicating device 45; weights indicated based on the weights indicated on a label 44 are $g1$ and $g2$; the maximum error weights per piece of commodities are $\pm c1$ and $\pm c2$; and a weight reduced due to removal of commodities 11 is $d$. Then, a weight indicated by the position-and-quantity-of-commodity-indicating device 45 is compared with a value measured by a weighing scale, so that determination may be made of whether a proper purchasing has been carried out for commodities purchased. In the following formula:

$$(g1-c1)+(g2-c2) \leqq d \leqq (g1+c1)+(g2+c2),$$

,

Note: If $g1$ and $g2$ are net weights, a weight factor for packaging is added thereto. The maximum error weight may be predetermined as $c\%$ for $g$.)

(a) if $d$ satisfies the above formula, then this means that proper purchasing has been carried out, while a shopping card may be taken out from a shopping-card-inserting slit 2 freely, without an alarm.

(b) if $d$ does not satisfy the above formula, then this means that:

(1) a foreign matter is included, (2) commodities not indicated have been taken out, (3) commodities indicated have not been taken out, (4) commodities different from those indicated have been taken out, (5) commodities having a weight different from that shown in a label attached to commodities 44 have been taken out, or (6) a weight measured beforehand varies to an extent exceeding the maximum error weight.

In these above cases, a notifying signal which notifies a purchaser of these facts or, if required, an alarm is issued, with a shopping card locked within a shopping-card-inserting slit 2.

(c) In case a variation is measured at a weighing scale, with a shopping card not inserted in shopping-card-inserting slit 2, a notifying signal or if required an alarm signal is issued.

In case commodities of a quantity exceeding a predetermined maximum quantity of commodities to be taken out have been taken out or an indicated quantity exceeds a maximum quantity of commodities to be taken out, a notifying signal or an alarm signal may be issued.

Figure 35:
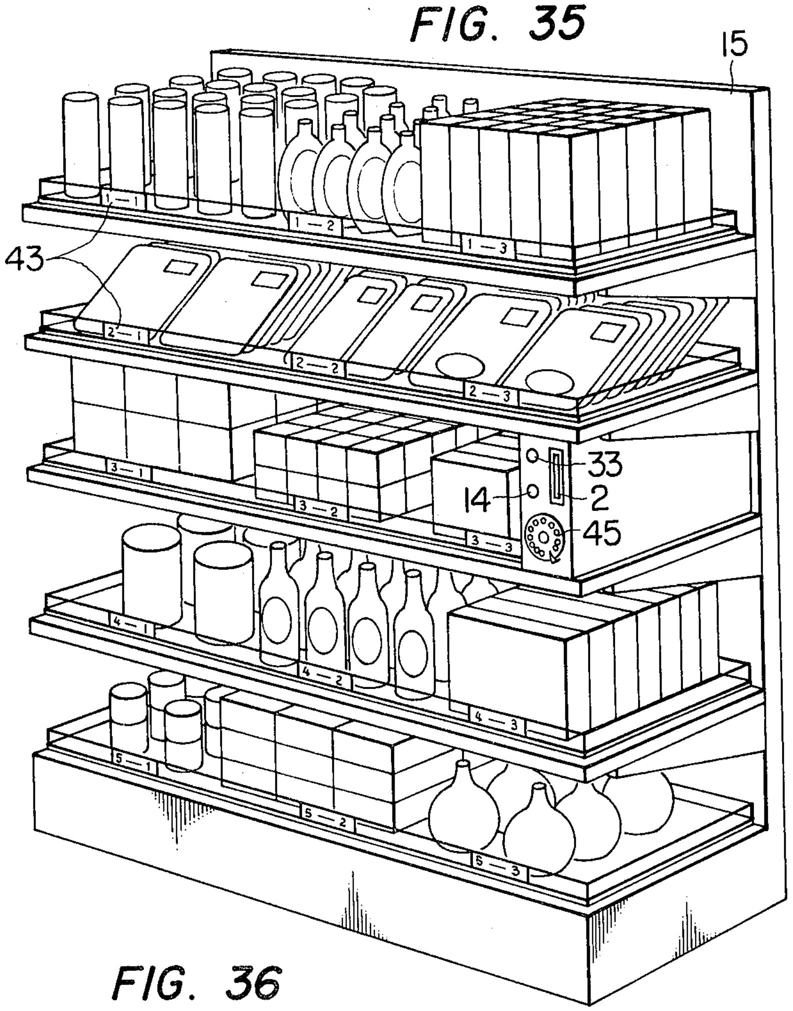
FIG. 35 is a perspective view of the automatic vending machine according to the present invention, in which a position-and-quantity-of-commodity-indicating device of a dial type is used.
Figure 36:
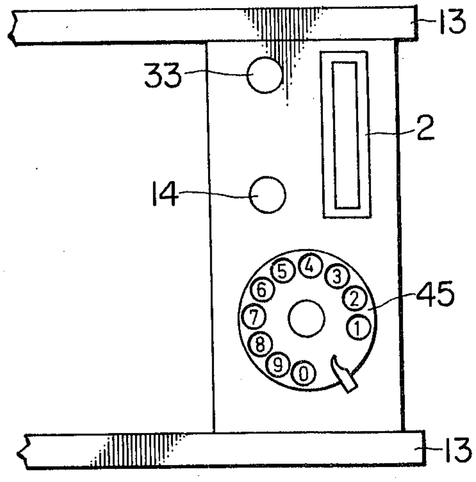
FIG. 36 is an enlarged view of the position-and-quantity-of-commodity-indicating device of FIG. 35.

In the aforesaid description, "ten-key" type push buttons are provided for a position-and quantity-of-commodity-indicating device 45 which indicates commodities 11 to be purchased. Alternatively, a dial system may be used instead. FIG. 35 is a perspective view of an automatic vending machine according to the present invention, which includes a dial type position-and-quantity-of-commodity-indicating device 45, and FIG. 36 is an enlarged view of a position-and-quantity-of-commodity-indicating device of FIG. 35.

A position symbol indicating the position of commodities 11, such as 1-1, 1-2, etc., has been used in the previous embodiments. However, the alphabet or the like may be used, in place of numbers, for example the position may be indicated by A-1, B-3, etc., so that push buttons marked with the alphabet may be used instead of or in addition to the 10-key push buttons or a dial in the position-and-quantity-of-commodity-indicating device.

The aforesaid description has not referred to the cancellation or correction of indications. However, there may be provided means for cancelling or correcting indications in the position-and-quantity-of-commodity-indicating device 45. Still alternatively, there may be provided a mechanism which may cancel and correct indications, separately of the position-and-quantity-of-commodity-indicating device 45.

Figure 37:
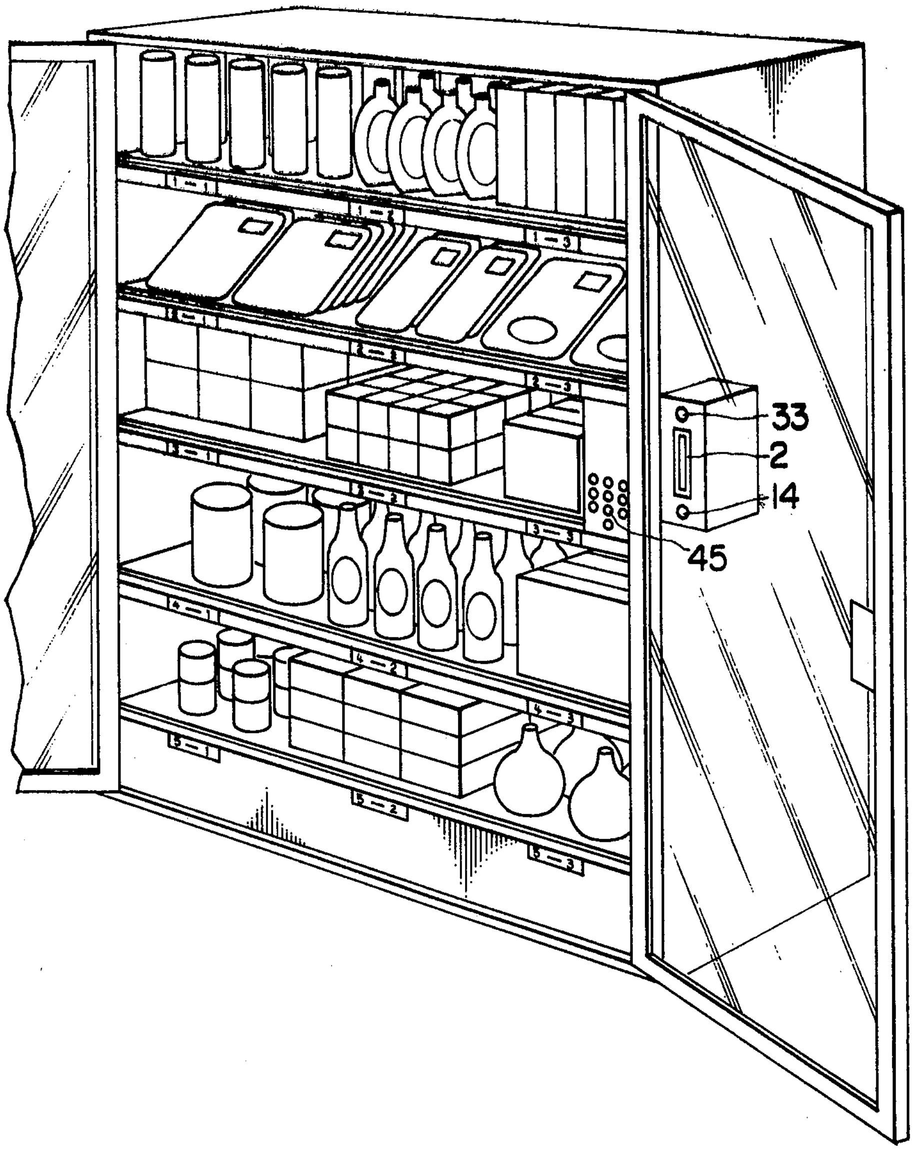
FIG. 37 is a perspective view of the seventh embodiment of the automatic vending machine according to the present invention.

FIG. 37 is a perspective view of the seventh embodiment of the automatic vending machine according to the invention. This vending machine uses a door as provided in the automatic vending machine in the sixth embodiment of the invention. Shown is a door which is maintained closed, when a shopping card is not in a shopping-card-inserting slit 2, and which becomes free to open and close, when a shopping card is inserted in a shopping-card-inserting slit 2. When the door remains open, a shopping card can not be taken out from the slit 2, while the shopping card may be taken out from the slit 2, only when a quantity of commodities which has been indicated in the position-and-quantity-of-commodity-indicating device 45 is in coincidence with a value measured by a weighing scale. Shown at 14 is a shopping-completion-indicating device which indicates the completion of shopping, and an indication is given by means of a push button. Meanwhile, the shopping-completion-indicating device 14 should not necessarily be of a type, in which a purchaser pushes a push button, but may be so designed as to be automatically actuated, when the door 9 is closed. In addition, a push button in the shopping-completion-indicating device 14 is located externally of the body proper 1 of the machine. However, it may be positioned internally, i.e., in the close vicinity of a push button in the position-and-quantity-of-commodity-indicating device 45. Determination of whether proper purchasing has been carried out is given in the same manner as in the preceding sixth embodiment of the invention, and thus description is omitted.

Meanwhile, in the fourth embodiment, description has referred to an automatic vending machine having a commodity-retaining means for maintaining commodities at a given temperature and means for maintaining a weighing scale at a given temperature different from the former given temperature. However, these means may be applied to all other embodiments. In addition, in the fifth embodiment, description has referred to an automatic vending machine having: reading means for reading a record on a label, on which there are indicated at least one commodity information of identification number, weight, price and other commodity informations, and for feeding same as an electrical signal; and means for comparing a numerical value obtained from means for converting a numerical value corresponding to a quantity of commodities taken out, into a electrical signal, with a numerical value obtained from the aforesaid reading means. However, these means are applicable to all other embodiments. Furthermore, in the first embodiment, description has referred to an automatic vending machine having at least one communicating means of: means for issuing an alarm signal and means for issuing a notifying signal, when there have been taken out commodities of a quantity exceeding a predetermined maximum quantity of commodities for each item thereof; means for issuing an alarm signal and means for issuing a notifying signal, when other commodities having different weight or foreign matters are included; and means for issuing an alarm signal and means for issuing a notifying signal, in the event of an unlawful act or acts which do not conform to a regulation set forth. However, these communicating means are all applicable to other embodiments.

Description has been given thus far of cases relating to the purchasing procedure for purchasers. However, the aforesaid lock-releasing medium, or a lock-releasing and storing medium may be used for supplying commodities to an automatic vending machine or for moving commodities due to a need to change the location of a sales room, so that moving information of these commodities may be notified simply. (This may be used for inventory, as well.)

As is apparent from the foregoing description of the automatic vending machine according to the present invention, there may be achieved many advantages as shown in Table 1 for a market side, so that prices of commodities to be supplied to customers may be reduced to a great extent, so that one can win in a keen competition in this field. On the other hand, purchasers may obtain commodities at a low price, and may check and select a commodity in one's hands, before purchasing.

Table 1

| | Item | (a) | (b) | (c) |
|---|---|---|---|---|
| 1 | A quantity of commodities sold daily may be automatically checked per item | x | o | o |
| 2 | Inventory of commodities may be automatically controlled | x | o | o |
| 3 | Laying in or supplementing stocks and placing an order may be automatically carried out | x | o | o |
| 4 | Inventory is not required | x | o | o |
| 5 | Man power required for accounting may be saved | x | o | o |
| 6 | Accounting is speeded up | x | o | o |
| 7 | Accounting is accurate | x | o | o |
| 8 | Cleaning of shelves, on which are placed commodities, may be carried out simply | x | Δ | o |
| 9 | Supplementing of shelves for commodities may be made with ease | Δ | x | o |
| 10 | A machine is well adapted for use in sales of a great amount of commodities | o | x | o |
| 11 | A purchaser may select commodities by taking same in one's hands | o | x | o |
| 12 | No time is wasted until commodities are taken out by a purchaser | — | x | o |
| 13 | No trouble takes place in taking out commodities | — | x | o |
| 14 | Amount of investment for equipment | o | x | Δ |

Table 1-continued

| Item | (a) | (b) | (c) |
|---|---|---|---|
| is reduced | | | |
| 15 A market may be run for 24 hours with ease | x | o | o |

Note:
(a) A market using a system, in which commodities are displayed on shelves.
(b) Manless super-market.
(c) A super-market using a group of automatic vending machines according to the present invention.
o: yes
—: not applicable
x: no
Δ: midway between o and x

What is claimed is:

1. A vending machine, comprising:

a casing; a weighing scale means having at least one retaining vessel for retaining like commodities therein within said casing and a weighing circuit, said weighing scale means weighing said retaining vessel and the retained commodities, and said weighing circuit producing an electric signal correlated to the weight of said weighing vessel and the retained commodities;

access means having a lock that is normally locked to prevent access through said casing, and that can be released providing access through said casing to said commodities;

converting means including a computing circuit for comparing the weights of said retaining vessel and retained commodities before and after the removal of commodities from said retaining vessel, and producing an electrical signal output corresponding to a numerical value of the quantity of commodities removed; and means for admitting a lock-releasing medium to release the lock of said access means to permit removal of commodities only upon the admission of said medium and prevent the removal of commodities in the absence of said lock-releasing medium.

2. A vending machine as set forth in claim 1, wherein said access means has a front opening in said casing providing shopping access through said casing to the commodities retained within said retaining vessel for their removal and purchase, and an electromagnetic radiation beam source; said lock having means for directing said beam in a beam screen over the entire front opening of said access means, and an electric circuit means for issuing an alarm signal, in the event that said beam is interrupted without said lock being released by said lock releasing medium.

3. A vending machine as set forth in claim 1, wherein said machine further comprises heat exchange means for maintaining said commodities at a temperature different from the environment; and means for maintaining said weighing scale means at a temperature substantially different from the temperature of said commodities.

4. A vending machine as set forth in claim 1, for dispensing commodities having a label containing a record of descriptive information about commodities, wherein said machine further comprises: automatic character recognition reading means for reading a record on a commodity label and thereafter feeding an electrical signal correlated to the read information as an output; and means for comparing said electrical signal from said reading means with the numerical value electrical signal obtained from said converting means and producing a corresponding comparison electrical signal output.

5. A vending machine as set forth in claim 1, wherein said computing circuit includes a stored fixed maximum quantity of commodities retrievable as an electrical signal, and further comprises communicating means for issuing a discrepancy electrical signal when there have been taken out commodities of a quantity exceeding the fixed maximum quantity for each item of commodities by comparing said converting means output with said fixed maximum quantity retrievable electrical signal.

6. A vending machine as set forth in claim 1, wherein said computing circuit includes a stored fixed average weight of said commodities retrievable as an electrical signal, and further comprises communicating means for issuing a discrepancy electrical signal when items having different weights from said commodities are retained in said vessel by comparing the weighing electrical signal of the commodities and items retained in said retaining vessel with the whole number multiples of said average weight retrievable signal representing a fixed average weight of said commodities.

7. A vending machine as set forth in claim 1, wherein said machine further comprises means for manually entering an electrical signal corresponding to and visibly indicating the number of commodities desired to be purchased.

8. A vending machine as set forth in claim 7, wherein said machine further comprises communicating means for issuing a discrepancy electrical signal when the number of items actually taken out of said retaining vessel is different from the number of items desired as determined by automatically comparing said converting means electrical signal with the entered electrical signal of said means for entering and indicating.

9. A vending machine as set forth in claim 7, wherein said computing circuit includes a stored fixed maximum quantity of commodities retrievable as an electrical signal, and further comprises communicating means for issuing a discrepancy electrical signal when there have been taken out commodities of a quantity exceeding the fixed maximum quantity for each item of commodities by comparing said converting means output with said fixed maximum quantity retrievable electrical signal.

10. A vending machine as set forth in claim 1, wherein said machine further comprises: a position and quantity of commodity indicating means for manually entering an electrical signal into said computing circuit indicating the position and numerical value quantity of commodities desired to be purchased; means for comparing the electrical signal of the numerical value quantity indicated in said position and quantity indicating means with the numerical value electrical signal obtained from said converting means that corresponds to the quantity of commodities taken out, and providing a corresponding comparison electrical signal output; and means for permitting the removal of said lock-releasing medium when said numerical values are substantially identical with each other as determined by said comparing means output, and for locking said lock-releasing medium to preclude the removal of said lock-releasing medium when said numerical values are substantially different from each other.

11. A vending machine as set forth in claim 10, wherein said machine further comprises communicating means for issuing a discrepancy electrical signal when said numerical values are substantially different from each other by automatically comparing said converting means electrical signal output with the electrical signal of the numerical value of quantities desired to be purchased as entered in said position and quantity of commodity indicating means.

12. A vending machine as set forth in claim 10, wherein said computing circuit includes a stored fixed maximum quantity of commodities retrievable as an electrical signal, and further comprises communicating means for issuing a discrepancy electrical signal when there have been taken out commodities of a quantity exceeding the fixed maximum quantity for each item of commodities by comparing said converting means output with said fixed maximum quantity retrievable electrical signal.

13. A vending machine as set forth in claim 1, wherein said access means further comprises: a door in said casing providing access to commodities within said retaining vessel by purchasers desiring said commodities; said lock having means for normally locking said door and releasing said door when said lock-releasing medium is admitted; means for maintaining said door in its locked position when said lock-releasing medium is not admitted; means for precluding the removal of said lock-releasing medium admitted, when said door is open; and means for permitting removal of said lock-releasing medium when said door is closed.

14. A vending machine as set forth in claim 13, wherein said machine further comprises: a position and quantity of commodity indicating means for manually entering an electrical signal into said computing circuit indicating the position and numerical value quantity of commodities desired to be purchased; means for comparing the electrical signal of the numerical value quantity indicated in said position and quantity indicating means with the numerical value electrical signal obtained from said converting means that corresponds to the quantity of commodities taken out, and providing a corresponding comparison electrical signal output; and means for permitting the removal of said lock-releasing medium when said numerical values are substantially identical with each other as determined by said comparing means output, and for locking said lock-releasing medium to preclude the removal of said lock-reducing medium when said numerical values are substantially different from each other.

15. A vending machine as set forth in claim 14, wherein said machine further comprises communicating means for issuing a discrepancy electrical signal when said numerical values are substantially different from each other by automatically comparing said converting means electrical signal output with the electrical signal of the numerical value of quantities desired to be purchased as entered in said position and quantity of commodity indicating means.

16. A vending machine as set forth in claim 14, wherein said computing circuit includes a stored fixed maximum quantity of commodities retrievable as an electrical signal, further comprises communicating means for issuing a discrepancy electrical signal when there have been taken out commodities of a quantity exceeding the fixed maximum quantity of commodities by automatically comparing said converting means output with said fixed maximum quantity retrievable electrical signal.

17. A vending machine as set forth in claim 1, wherein said machine further comprises means for receiving a storing medium and automatically entering into said storing medium at least one commodity information specific to said commodities removed.

18. A vending machine as set forth in claim 17, wherein said access means has a front opening in said casing providing shopping access through said casing to the commodities retained within said retaining vessel for their removal and purchase, and an electromagnetic radiation beam source; said lock having means for directing said beam in a beam screen over the entire front opening of said access means, and an electric circuit means for issuing an alarm signal, in the event that said beam is interrupted without said lock being released by said lock releasing medium.

19. A vending machine as set forth in claim 17, wherein said machine further comprises heat exchange means for maintaining said commodities at a temperature different from the environment; and means for maintaining said weighing scale means at a temperature substantially different from the temperature of said commodities.

20. A vending machine as set forth in claim 17 for dispensing commodities having a label containing a record of descriptive information about commodities, wherein said machine further comprises; automatic character recognition reading means for reading a record on a commodity label and thereafter feeding an electrical signal correlated to the read information as an output; means for comparing said electrical signal obtained from said converting means and producing a corresponding comparison electrical signal output; and means for indicating the completion of shopping.

21. A vending machine as set forth in claim 17, wherein said computing circuit includes a stored fixed maximum quantity of commodities retrievable as an electrical signal, and further comprises communicating means for issuing a discrepancy electrical signal when there have been taken out commodities of a quantity exceeding the fixed maximum quantity for each item of commodities by comparing said converting means output with said fixed maximum quantity retrievable electrical signal.

22. A vending machine as set forth in claim 17, wherein said computing circuit includes a stored fixed average weight for said commodities retrievable as an electrical signal, and further comprises communicating means for issuing a discrepancy electrical signal when items having different weights from said commodities are retained in said vessel by comparing the weighing electrical signal of the commodities and items retained in said retaining vessel with the whole number multiples of said average weight retrievable signal representing a fixed average weight of said commodities.

23. A vending machine as set forth in claim 17, wherein said machine further comprises: a position and quantity of commodity indicating means for manually entering an electrical signal into said computing circuit indicating the position and numerical value quantity of commodities desired to be purchased; means for comparing the electrical signal of the numerical value quantity indicated in said position and quantity indicating means with the numerical value electrical signal obtained from said converting means that corresponds to the quantity of commodities taken out, and providing a corresponding comparison electrical signal output; and means for permitting the removal of said storing medium when said numerical values are substantially identical with each other as determined by said comparing means output, and for locking said storing medium to preclude the removal of said storing medium when said numerical values are substantially different from each other.

24. A vending machine as set forth in claim 23, wherein said machine further comprises communicating means for issuing a discrepancy electrical signal when said numerical values are substantially different from each other by automatically comparing said converting means electrical signal output with the electrical signal of the numerical value of quantities desired to be purchased as entered in said position and quantity of commodity indicating means.

25. A vending machine as set forth in claim 23, wherein said computer circuit includes a stored fixed maximum quantity of commodities retrievable as an electrical signal, and further comprises communicating means for issuing a discrepancy electrical signal when there have been taken out commodities of a quantity exceeding the fixed maximum quantity of commodities by automatically comparing said converting means output with said fixed maximum quantity retrievable electrical signal.

26. A vending machine as set forth in claim 17, wherein said machine further comprises means for manually entering an electrical signal corresponding to the number of commodities desired to be purchased; and means for manually entering an electrical signal indicating the completion of shopping to release said storing medium if said automatic entering means has finished entering its information.

27. A vending machine as set forth in claim 26, wherein said machine further comprises communicating means for issuing a discrepancy electrical signal when the number of items actually taken out of said retaining vessel is different from the number of items desired as determined by automatically comparing said converting means electrical signal with the electrical signal entered by said means for indicating the number of commodities desired to be purchased.

28. A vending machine as set forth in Claim 26, wherein said computing circuit includes a stored fixed maximum quantity of commodities retrievable as an electrical signal, and further comprises communicating means for issuing a discrepancy electrical signal when there have been taken out commodities of a quantity exceeding the fixed maximum quantity for each item of commodities by comparing said converting means output with said fixed maximum quantity retrievable electric signal.

29. A vending machine as set forth in claim 17, wherein said access means further comprises: a door in said casing providing access to commodities within said retaining vessel by purchasers desiring said commodities; set lock having means for normally locking said door and releasing said door when said storing medium is admitted; means for maintaining said door in its locked position when said storing medium is not admitted; means for precluding the removal of said storing medium admitted, when said door is open; and means for permitting removal of said storing medium when said door is closed.

30. A vending machine as set forth in claim 29, wherein said machine further comprises: a position and quantity of commodity indicating means for manually entering an electrical signal into said computing circuit indicating the position and numerical value quantity of commodities desired to be purchased; means for comparing the electrical signal of the numerical value quantity indicated in said position and quantity indicating means with the numerical value electrical signal obtained from said converting means that corresponds to the quantity of commodities taken out, and providing a corresponding comparison electrical signal output; and means for permitting the removal of said storing medium when said numerical values are substantially identical with each other as determined by said comparing means output, and for locking said storing medium to preclude the removal of said storing medium when said numerical values are substantially different from each other.

31. A vending machine as set forth in claim 30, wherein said machine further comprises communicating means for issuing a discrepancy electrical signal when said numerical values are substantially different from each other by automatically comparing said converting means electrical signal output with the electrical signal of the numerical value of quantities desired to be purchased as entered in said position and quantity of commodity indicating means.

32. A vending machine as set forth in claim 30, wherein said computing circuit includes a stored fixed maximum quantity of commodities retrievable as an electrical signal, and further comprises communicating means for issuing a discrepancy electrical signal when there have been taken out commodities of a quantity exceeding the fixed maximum quantity of commodities by automatically comparing said converting means output with said fixed maximum quantity retrievable electrical signal.

* * * * *